United States Patent
Yabusaki et al.

[11] Patent Number: 6,044,938
[45] Date of Patent: Apr. 4, 2000

[54] DUAL-MODE DRUM BRAKE HAVING PARKING LEVER PIVOTABLE ABOUT AN AXIS PERPENDICULAR TO BACKING PLATE

[75] Inventors: Naoki Yabusaki, Toyota; Masaharu Ohba, Obara-mura; Mitsuyasu Mizuno; Kenichi Hasegawa, both of Toyota, all of Japan

[73] Assignee: Toyota Jidosha Kabushiki Kaisha, Aichi-ken, Japan

[21] Appl. No.: 08/884,209

[22] Filed: Jun. 27, 1997

[30] Foreign Application Priority Data

Jun. 28, 1996 [JP] Japan ................................. 8-169683
Jun. 23, 1997 [JP] Japan ................................. 9-165651

[51] Int. Cl.$^7$ .............................. F16D 51/46; F16D 65/24
[52] U.S. Cl. ............................... 188/106 F; 188/106 A
[58] Field of Search ........................ 188/106 A, 106 F, 188/106 P, 78

[56] References Cited

U.S. PATENT DOCUMENTS

| | | | |
|---|---|---|---|
| 2,144,025 | 1/1939 | Brie | 188/106 A |
| 2,281,150 | 4/1942 | Goepfrich | 188/106 A |
| 3,706,360 | 12/1972 | Nyundya | 188/106 A |
| 4,974,708 | 12/1990 | Maligne | 188/106 F |
| 5,002,159 | 3/1991 | Brix et al. | 188/106 A |
| 5,062,504 | 11/1991 | Yamamoto | 188/106 F |
| 5,070,968 | 12/1991 | Evans | 188/79.64 |
| 5,275,260 | 1/1994 | Evans et al. | 188/79.64 |

FOREIGN PATENT DOCUMENTS

| | | |
|---|---|---|
| 5533967 | 3/1980 | Japan . |
| 5610833 | 2/1981 | Japan . |
| 6170228 | 4/1986 | Japan . |

*Primary Examiner*—Matthew C. Graham
*Attorney, Agent, or Firm*—Kenyon & Kenyon

[57] ABSTRACT

A dual-mode drum brake assembly including a stationary backing plate opposed to a brake drum, a wheel cylinder disposed on the backing plate and having a pair of outwardly extendible pistons, an anchor fixed to the backing plate and opposite to said wheel cylinder diametrically of the backing plate, two brake shoes movably supported by the backing plate and having a first pair of adjacent ends opposite to the wheel cylinder and a second pair of adjacent ends opposite to the anchor, a parking lever disposed substantially along one of the two brake shoes and having a pivot axis perpendicular to the backing plate, at a portion thereof closer to the wheel cylinder, and a cable fixing portion closer to the anchor, and a link mechanism disposed between the parking lever and the brake shoes, and operating to move the adjacent ends of the second pair of the brake shoes away from each other, with a pivotal movement of the parking lever about the pivot axis when a torque acts on the brake drum.

16 Claims, 11 Drawing Sheets

DUAL-MODE DRUM BRAKE HAVING PARKING LEVER PIVOTABLE ABOUT AN AXIS PERPENDICULAR TO BACKING PLATE

This application is based on Japanese Patent Applications No. 8-169683 filed Jun. 28, 1996 and No. 9-165651 filed Jun. 23, 1997, the contents of which are incorporated hereinto by reference.

CROSS REFERENCE TO RELATED APPLICATIONS

Not Applicable

BACKGROUND OF THE INVENTION

1. Field of the Invention

This invention relates to improvements in a dual-mode drum brake which functions as the service brake in the form of a leading/trailing type brake during running of an automotive vehicle, and as the parking brake in the form of a duo-servo type brake.

2. Discussion of the Related Art

Generally, a leading/trailing type drum brake includes (a) a backing plate, (b) a wheel cylinder having a pair of pistons, (c) an anchor, and (d) a first brake shoe and a second brake shoe. The leading/trailing type drum brake is widely used as the service brake on an automotive vehicle, for decelerating the vehicle during running thereof. The backing plate is a generally circular disc which is a stationary member fixed on the vehicle such that the disc is opposed to an opening of a brake drum which rotates with a wheel of the vehicle. The wheel cylinder is a generally cylindrical member which is open at its opposite axial ends, and is disposed on a radially outer portion of the backing plate such that the axial direction of the wheel cylinder is substantially parallel to the circumferential direction of the backing plate. The two pistons are axially outwardly movable from the opposite open axial ends. The anchor is fixed to a circumferential portion of the backing plate that is diametrically opposite to the portion at which the wheel cylinder is disposed. The first and second brake shoes are supported by the backing plate movably in a plane of the backing plate, such that the opposite ends of the two brake shoes are opposed to the opposite ends of the wheel cylinder and the anchor. In operation, the two pistons of the wheel cylinder are moved in the opposite directions away from each other, so that each of the brake shoes is forced against the brake drum rotating with the vehicle wheel, with one of its opposite ends held in abutting engagement with the corresponding end of the anchor, whereby the wheel is braked.

As one type of the leading/trailing drum brake constructed as described above, there has been proposed a dual-mode drum brake wherein the parking brake for braking the vehicle during parking thereof acts as a duo-servo brake which is capable of providing a comparatively large braking force by a duo-servo mechanical brake action.

An example of the dual-mode drum brake is disclosed in U.S. Pat. No. 5,070,968 to A.C. Evans. This drum brake, which will be referred to as "first prior art drum brake", includes (a) an intermediate lever which is disposed substantially in parallel with the first brake shoe and connected to an intermediate portion of the first brake shoe such that the first brake shoe is pivotable about a first pivot axis perpendicular to the plane of the backing plate, (b) a pair of struts which are disposed substantially in parallel with each other and associated with the opposite end portions of the intermediate lever and the second brake shoe, (c) a parking lever which is connected to one end portion of one of the pair of struts that is located on the side of the anchor, such that the parking lever is pivotable about a second pivot axis substantially parallel to the plane of the backing plate, so that a pivotal movement of the parking lever about the second pivot axis causes the anchor side strut and the intermediate lever to be moved away from each other, for thereby applying a parking brake to the vehicle wheel.

Another example of the dual-mode drum brake is disclosed in U.S. Pat. No. 5,275,260 to A.C. Evans et al. This drum brake, which will be referred to as "second prior art drum brake", includes a parking lever which is disposed substantially in parallel with the second brake shoe and which is connected to the anchor side end portion of the second brake shoe pivotally about a second pivot axis perpendicular to the plane of the backing plate, so that a pivotal movement of the parking lever about the second pivot axis causes the anchor side strut and the second brake shoe to be moved away from each other, for thereby applying a parking brake to the wheel.

The first prior art drum brake is disadvantageous in that it is difficult to design the parking lever with a sufficient length. This difficulty arises from the orientation of the parking lever so as to extend in the direction perpendicular to the plane of the backing plate. This orientation requires the length of the parking lever to be accommodated in the axial dimension of the brake drum, and tends to limit the length of the parking lever. The limitation in the length of the parking lever in the first prior art drum brake makes it difficult to meet a general parking brake requirement that the pivoting angle of the parking lever be minimized while at the same time the operating stroke of the parking lever at its point of connection to a parking brake operating cable be maximized.

The parking brake operating cable is accommodated in an outer tube, and is fixed at one end thereof to the parking lever and at the other end to a parking brake operating member through an equalizer, an intermediate lever, etc. The outer tube is fixed at one end thereof to the backing plate and at the other end to the frame of the automotive vehicle. Upon operation of the parking brake operating member, the parking brake operating cable is moved relative to the outer tube, and an operating force is transmitted from the operating member to the parking lever of the drum brake assembly. Since the cable and the outer tube are curved and there exists a clearance between the diameter of the cable and the inside diameter of the outer tube, the other end of the outer tube remote from the backing plate and the corresponding portion of the cable can be moved relative to each other by a given distance even when the end of the outer tube fixed to the backing plate and the corresponding portion of the cable are not moved relative to each other. Namely, there exists a given amount of play between the cable and the outer tube. This play causes an undesirable increase of the required operating stroke of the parking brake operating member. Further, the operating stroke is unnecessarily increased by elongation of the cable and contraction of the outer tube. The amounts of these play, elongation and contraction largely depend on the specific construction of the parking brake. It is desirable to reduce the ratio of the ineffective portion of the overall operating stroke of the parking brake operating member, for increasing the ratio of the effective portion of the operating stroke which is used for moving the portion of the parking lever of the drum brake assembly at which the cable is fixed. This ratio of the effective portion of the operating stroke of the parking brake operating member can be increased by increasing the operating stroke of the parking lever at its cable fixing portion, that is, by increasing the length of the parking lever. An increase of the length of the parking lever also results in a decrease in the required pivoting angle of the parking lever.

In the first prior art drum brake, however, the length of the parking lever is limited since the length should be accommodated within the axial dimension of the brake drum as discussed above. Accordingly, the first prior art drum brake cannot meet the above-indicated requirement.

The comparatively short parking lever has another drawback, that is, a relatively low freedom of design relating to the lever ratio, more specifically a ratio of a distance between the pivoting axis of the parking lever and the cable fixing portion of the parking lever (to which the parking brake operating force is applied), to a distance between the pivoting axis of the parking lever and a point at which the force acts on the brake shoe through the intermediate lever. Thus, the first prior art drum brake suffers from difficulty to increase the boosting ratio. Accordingly, the tensile and compressive forces applied to the cable and the outer tube tend to be comparatively large, requiring the cable and outer tube to have an accordingly high strength, undesirably increasing the weight and cost of manufacture of the cable and outer tube.

In the second prior art drum brake, on the other hand, the parking lever extends substantially in parallel with the second brake shoe, and is pivotally connected to the appropriate end portion of the second brake shoe such that the parking lever is pivotable about the axis perpendicular to the plane of the backing plate. This arrangement permits the parking lever to have a comparatively large length, which makes it easier to increase the operating stroke of the parking lever at its cable fixing portion and the boosting ratio while reducing the required pivoting angle of the parking lever. However, since the cable fixing portion of the parking lever is located on the side of the wheel cylinder, the cable should extend through a space between the parking lever and the wheel cylinder, leading to relatively difficult positioning of the cable through the portion of the vehicle frame near the drum brake assembly. Described in detail, the drum brake assembly is usually oriented such that the wheel cylinder is located right above the axis of the brake drum. In the portion of the vehicle frame in the vicinity of the wheel brake cylinder, there are disposed various components such as a coil spring and other suspension parts, and some parts of the vehicle body. For facilitating the installation and positioning of the cable, the parking lever is desirably supported at a portion thereof on the side of the wheel cylinder, while the cable fixing portion is desirably located on the side of the anchor. In the second prior art drum brake, however, the cable fixing portion is located on the side of the wheel cylinder.

The wheel cylinder may be offset from the upper portion of the backing plate in the circumferential direction of the backing plate. In this case, too, it is difficult to position the parking brake operating cable if the cable fixing portion is located on the side of the wheel cylinder, because the cable should be installed so as to avoid an interference with a piping for applying a pressurized fluid to the wheel cylinder.

SUMMARY OF THE INVENTION

It is therefore an object of the present invention to provide a dual-mode drum brake assembly wherein the parking lever has a sufficient length and is connected to a parking brake operating cable at a portion thereof located on its side remote from the wheel cylinder.

The above object may be achieved by the following embodiments of the present invention which are numbered for identification and whose dependency upon each other is indicated in the same manner as in the claims, to show possible combinations of the features of this invention.

(1) A dual-mode drum brake assembly for a vehicle wheel, comprising: (a) a stationary backing plate in the form of a generally circular disc opposed to an opening of a brake drum rotated with the vehicle wheel; (b) a wheel cylinder which is open at opposite ends thereof and which is disposed on a radially outer portion of the backing plate such that an axial direction of the wheel cylinder is tangential to a circumference of the backing plate, the wheel cylinder having a pair of pistons which are extendible outwardly from the opposite ends; (c) an anchor fixed to a circumferential portion of the backing plate which is diametrically opposite to the radially outer portion; (d) two brake shoes which are supported by the backing plate movably in a plane parallel to a plane of the backing plate, the two brake shoes having a first pair of adjacent ends opposed to the opposite ends of the wheel cylinder, and a second pair of adjacent ends opposite to the first pair and opposed to respective opposite ends of the anchor; (e) a parking lever disposed substantially along one of the two brake shoes, and having a pivot axis at a portion thereof closer to the wheel cylinder than to the anchor, and a cable fixing portion at a free end portion thereof closer to the anchor than to the wheel cylinder, the pivot axis being perpendicular to the plane of the backing plate; and (f) a link mechanism disposed between the parking lever and the two brake shoes, and operating to move the adjacent ends of the second pair of the two brake shoes away from each other, with a pivotal movement of the parking lever about the pivot axis, at least when a torque acts on the brake drum.

The parking lever "disposed substantially along" one of the two brake shoes may be disposed so as to extend in parallel with the above-indicated one of the brake shoes, or such that the longitudinal direction of the parking lever is inclined with respect to the longitudinal direction of the brake shoe in question.

In the drum brake assembly constructed according to the embodiment (1) of the present invention, an operation of a service brake operating member will cause a pressure of a working fluid (e.g., a hydraulic pressure of a working oil) to be applied to the wheel cylinder. As a result, the pistons are moved outwardly away from each other to force the two brake shoes outwardly away from each other such that the brake shoes are pivoted about the points of abutting contact with the anchor, whereby the brake shoes are forced against the inner circumferential surface of the brake drum, to produce a braking force acting on the rotating brake drum. Thus, the drum brake assembly acts as a leading/trailing brake for braking the vehicle wheel. When a parking brake operating member is operated while the service brake remains applied, the parking lever is pivoted about its pivot axis, and the link mechanism is operated to place the drum brake assembly in a state in which it acts as the leading/trailing brake. When the brake drum is rotated by a large torque acting on the vehicle wheel after the service brake operating member is returned to its non-operated position, the two brake shoes tend to be dragged along with the brake drum, and torques act on the brake shoes due to the dragging tendency, so that the primary brake shoe (trailing brake shoe) on the upstream side as viewed in the rotating direction of the brake drum is rotated away from the anchor while the secondary brake shoe (leading brake shoe) on the downstream side as viewed in the rotating direction is held in abutting contact with the anchor. The torque acting on the primary brake shoe causes the link mechanism to place the drum brake assembly in the state in which the drum brake assembly acts as a duo-servo brake. Thus, the transition from the leading/trailing brake system to the duo-servo brake system takes place. Namely, the link mechanism operates to transmit the torque from the primary brake shoe to the secondary brake shoe, whereby the secondary brake shoe is forced against the inner circumferential surface of the brake drum, producing a duo-servo braking effect. The link mechanism is preferably arranged to prevent a movement of the cable fixing portion of the parking lever upon the transition from the leading/trailing brake system to the duo-servo brake system. If the cable fixing portion is moved in the direction in which a parking brake operating cable is pulled, the tensile force acting on the cable is reduced, resulting in reducing the force applied to the cable fixing portion of the parking lever, and consequent reduction in the braking force produced. If the cable fixing portion is moved in the reverse direction, the tensile force acting on the cable is increased, giving rise to a risk of overloading of the components of the drum brake assembly and a parking brake operating device which includes the cable and the parking brake operating member.

When the parking brake operating member is operated while the service brake is not applied, the two brake shoes are moved away from each other by the link mechanism, and forced against the inner circumferential surface of the brake drum. It is not predictable whether the drum brake assembly acts as the leading/trailing brake or the duo-servo brake, at this time. If the brake drum is rotated by a drive torque larger than the braking torque acting thereon while the drum brake assembly is acting as the leading/trailing brake, the two brake shoes tend to be dragged along with the brake drum, and the brake shoe on the upstream side as viewed in the rotating direction of the brake drum is moved away from the anchor while the brake shoe on the downstream side is held in abutting contact with the anchor, whereby the drum brake assembly changes to a state in which it acts as the duo-servo brake. If the drum brake assembly is acting as the duo-servo brake upon operation of the parking brake operating member, the drum brake assembly remains to act as the duo-servo brake.

Since the parking lever is disposed so as to extend substantially along one of the brake shoes, the parking brake can be comparatively easily given a relatively large length, and an accordingly increased operating stroke at the cable fixing portion. Therefore, the ratio of the effective portion of the operating stroke of the parking brake operating member can be accordingly increased, while minimizing the pivoting angle of the parking lever. Further, the present arrangement permits an increased degree of freedom of design relating to the lever ratio of the drum brake assembly, more specifically, the ratio of a distance between the pivot axis and the cable fixing portion, to a distance between the pivot axis and a point at which the link mechanism receives the force from the parking lever. In other words, the present drum brake assembly can be easily given a high lever ratio, so that the parking brake can be applied with an operating force which is almost the same as in an ordinary leading/trailing type drum brake assembly wherein the parking brake also acts as a leading/trailing brake. However, the parking brake force produced by the present drum braking assembly is larger than that in the conventional leading/trailing drum brake assembly, by an amount corresponding to the duo-servo braking effect or function. In other words, the required braking force can be obtained with a reduced operating force applied to the parking brake operating member, so that the force acting on the cable upon the parking brake application is accordingly reduced, and the required strength of the cable is reduced. Therefore, the present drum brake assembly may be manufactured with a reduced weight and at a reduced cost.

Since the pivot axis of the parking lever is located closer to the wheel cylinder than to the anchor while the cable fixing portion is located closer to the anchor than to the wheel cylinder, the cable can be easily positioned without an interference with a piping connected to the wheel cylinder to apply the hydraulic pressure thereto and various components such as those of a vehicle suspension system. In most cases, the wheel cylinder and the anchor are fixed to an upper portion and a lower portion of the backing plate, respectively. The orientation of the parking lever described above permits easy positioning of the cable not only where the wheel cylinder and the anchor are spaced apart from each other in the vertical direction, but also where they are spaced apart from each other in the horizontal direction.

(2) A dual-mode drum brake assembly according to the embodiment (1), wherein the wheel cylinder and the anchor are fixed to an upper portion and a lower portion of the backing plate, respectively, and the parking lever has the pivot axis at an upper portion thereof and is suspended downwardly from the pivot axis.

In the drum brake assembly according to the embodiment (2) of the present invention, the parking brake operating cable fixed to the cable fixing portion of the parking lever can be easily positioned so as to go out of the drum brake assembly, extending through a cable aperture formed in a lower portion of the backing plate which is relatively near the anchor. To prevent downward displacement of the two brake shoes, it is desired that the opposite abutting surfaces of the anchor which are opposed to the second pair of adjacent ends of the two brake shoes are given a suitable anchor angle while these adjacent ends of the first pair are biasing toward each other by a return spring. The anchor angle is an angle with respect to a plane which passes the intermediate parts of the wheel cylinder and the anchor and which is perpendicular to the plane of the backing plate. The anchor angle is determined such that the distance between the abutting surfaces of the anchor increases in the downward direction or radially outward direction of the brake drum.

(3) A dual-mode drum brake assembly according to the embodiment (1) or (2), wherein the above-indicated one and the other of the two brake shoes consist of a first brake shoe and a second brake shoe, respectively, and the link mechanism includes: an intermediate lever having an intermediate portion connected to an intermediate portion of the first brake shoe such that the intermediate lever is pivotable about a pivot axis perpendicular to the plane of the backing plate, the intermediate lever including a first arm extending from the intermediate portion in a direction toward the wheel cylinder, and a second arm extending the intermediate portion in a direction toward the anchor, the parking lever being connected to the first arm pivotally about the pivot axis of the intermediate lever; a first strut operatively associated at opposite end portions thereof respectively with portions of the first and second brake shoes which are closer to the wheel cylinder than to the anchor, the first strut being engageable with a portion of the parking lever between the pivot axis and the the free end portion; and a second strut operatively associated at opposite end portions thereof respectively with the second arm of the intermediate lever and a portion of the second brake shoe which is closer to the anchor than to the wheel cylinder.

In the embodiment (3), the brake shoe to which the intermediate lever is pivotally connected is referred to as the first brake shoe, and the other brake shoe is referred to as the second brake shoe. The first brake shoe may be either the leading brake shoe or the trailing brake shoe where the automotive vehicle is running in the forward direction.

In the dual-mode drum brake assembly according to the embodiment (3), the operation of the parking brake operating member will cause the parking lever to be pivoted about its pivot axis, forcing the first strut to move the end portion of the second brake shoe on the side of the wheel cylinder, in the outward direction toward the inner circumferential surface of the brake drum. At the same time, a reaction force acts on the portion of the parking lever corresponding to the pivot axis, in the outward direction. As a result, a torque acts on the intermediate lever so as to pivot the intermediate lever in a direction in which the second arm is moved toward the second brake shoe, so that the second strut is forced to move the end portion of the second brake shoe on the side of the anchor in the outward direction. A reaction force acts on the second arm of the intermediate lever. With this reaction force acting on the intermediate lever and the force transmitted to the intermediate lever from the pivot axis of the parking lever, the entirety of the intermediate lever is forced outward, thereby forcing the first brake shoe outward against the brake drum, through the point of engagement of the intermediate lever with the first brake shoe. Thus, the first and second brake shoes are forced in the opposite directions away from each other by the parking lever and the link mechanism which includes the first and second struts and the intermediate lever. The operation of the present drum brake assembly described above is the same irrespective of whether the parking brake operating member is first operated during the service brake application and the service brake is then released, or the parking brake operating member is operated while the service brake is not applied. If the brake drum is rotated by a large drive torque acting on the vehicle wheel while the parking brake is applied, the first and second brake shoes tend to be dragged along with the brake drum. The torque produced by this dragging tendency is transmitted through the first strut from the brake shoe on the upstream side as seen in the rotating direction of the brake drum, to the brake shoe on the downstream side, and is received by the anchor. Thus, the drum brake assembly acts as the duo-servo brake generating a sufficiently large braking force due to a servo braking effect.

The first and second struts are preferably disposed so as to extend substantially in parallel with each other, and in the direction substantially parallel to the direction of outward movements of the first and second brake shoes, namely, in the direction which is substantially perpendicular to the straight line passing the centers of the wheel cylinder and anchor, and which is substantially parallel to the plane of the backing plate. It is also preferable to locate the first and second struts inwardly of the wheel cylinder and the anchor with relatively small spacing distances to the wheel cylinder and the anchor, as viewed in the radial direction of the backing plate. When the drum brake assembly acts as the duo-servo brake, it is desirable that the torque acting on the brake shoe on the upstream side as viewed in the rotating direction of the brake drum be transmitted directly to the first strut, and from the first strut to the brake shoe on the downstream side. Therefore, it is preferable to determine the length dimensions and the positions of the first and second struts, and the lever ratios of the intermediate lever and the parking lever, so as to meet the optional requirements indicated above.

(4) A dual-mode drum brake assembly according to the embodiment (1) or (2), wherein the other of the two brake shoes consists of a first brake shoe while the above-indicated one of the two brake shoes consists of a second brake shoe, and the link mechanism includes: an intermediate lever having an intermediate portion connected to an intermediate portion of the first brake shoe such that the intermediate lever is pivotable about a pivot axis perpendicular to the plane of the backing plate, the intermediate lever including a first arm extending from the intermediate portion in a direction toward the wheel cylinder, and a second arm extending the intermediate portion in a direction toward the anchor; a first strut operatively associated at opposite end portions thereof respectively with the first arm of the intermediate lever and a portion of the parking lever between the pivot axis and the free end portion; a second strut operatively associated at opposite end portions thereof respectively with the second arm of the intermediate lever and a portion of the second brake shoe which is closer to the anchor than to the wheel cylinder.

In the present embodiment (4), too, the brake shoe to which the intermediate lever is pivotally connected is referred to as the first brake shoe, and the other brake shoe is referred to as the second brake shoe. The first brake shoe may be the trailing or leading brake shoe where the vehicle is running in the forward direction.

In the dual-mode drum brake assembly according to the embodiment (4), the operation of the parking brake operating member will cause the parking lever to be pivoted about its pivot axis, forcing the first strut so as to pivot the intermediate lever in the direction in which the first arm is moved in the outward direction. At the same time, a reaction force acts on the portion of the parking lever corresponding to the pivot axis, in the outward direction. As a result, the portion of the second brake shoe which is closer to the wheel cylinder than to the anchor is forced outward. Further, a force is transmitted from the intermediate lever through the second strut to the portion of the second brake shoe which is closer to the anchor than to the wheel cylinder, so that the second brake shoe is forced outward. A reaction force acts on the intermediate. With this reaction force acting on the intermediate lever, and the force transmitted from the first strut to the intermediate lever, the entirety of the intermediate lever is moved outward, forcing the first brake shoe outward through the pivotal connection of the intermediate lever and the first brake shoe. The operation of the present drum brake assembly described above is the same irrespective of whether the parking brake operating member is first operated during the service brake applicatnion and the service brake is then released, or the parking brake operating member is operated while the service brake is not applied. If the brake drum is rotated by a large drive torque actiong on the vehicle wheel while the parking brake is applied, the first and second brake shoes tend to be dragged along with the brake drum. The torque produced by this dragging tendency is transmitted from the brake shoe on the upstream side as seen in the rotating direction of the brake drum, to the brake shoe on the downstream side, through the first strut, intermediate lever, etc. As a result, the brake shoe on the downstream side is held in abutting contact with the anchor, and the drum brake assembly acts as the duo-servo brake.

(5) A dual-mode drum brake assembly according to the embodiment (4), wherein the link mechanism comprises a third strut which extends substantially in parallel with the first strut and which is operatively connected at opposite ends thereof with portions of the first and second brake shoes which are closer to the wheel cylinder than to the anchor.

In the drum brake assembly according to this embodiment (5), the first and second brake shoes are forced against the brake drum, with the forces transmitted in the same manner as described above with respect to the embodiment (4), upon operation of the parking brake operating member. This operation of the drum brake assembly is the same irrespective of whether the parking brake operating member is first operated during the service brake application and the service brake is then released, or the parking brake operating member is operated while the service brake is not applied. If the drum brake is rotated by a large drive torque acting thereon, the torque produced by the dragging is transmitted from the brake shoe on the upstream side as viewed in the rotating direction of the brake drum to the brake shoe on the downstream side, so that the downstream brake shoe is held in abutting contact with the anchor, and the drum brake assembly acts as the duo-servo brake.

In the drum brake assembly according to the above embodiment (4) which uses only the two struts, the torque produced by the dragging tendency of the brake shoes is also applied to the intermediate lever, second strut, etc. Accordingly, these members should have comparatively high strength and rigidity. In the drum brake assembly according to the present embodiment (5) using the three struts, however, the torque due to the dragging tendency is transmitted through the third strut between the first and second brake shoes, so that the required strength and rigidity of the parking lever, the intermediate lever, second strut, etc. may be reduced.

In the drum brake assembly according to the embodiment (5), the first strut functions to move the first and second brake shoes away from each other when the parking lever is pivoted upon operation of the parking brake operating member, and the third strut functions to transmit the torque produced by the dragging tendency between the first and second brake shoes. In the drum brake assembly according to the embodiment (3) or (4), the first strut also serves the function of the third strut.

(6) A dual-mode drum brake assembly according to the embodiment (5), wherein the third strut is provided with a length adjusting mechanism for adjusting a length of the third strut.

The length adjusting mechanism provided in the embodiment (6) may be adapted to increase the length of the third strut as the amount of wear of the brake shoes increases. The increase of the length of the third strut causes the non-operated positions of the brake shoes to be shifted toward the inner circumferential surface of the brake drum, whereby the amounts of clearance or gap between the brake shoes and the inner circumferential surface of the brake drum can be held within an optimum range, irrespective of the wear of the brake shoes. Thus, the length adjusting mechanism prevents a delay in the brake application due to an increase in the amounts of the above-indicated clearance or gap.

(7) A dual-mode drum brake assembly according to the embodiment (3) or (4), wherein the first strut is provided with a length adjusting mechanism for adjusting a length of the first strut.

The length adjusting mechanism provided in the embodiment (7) provides the same advantage as described above with respect to the embodiment (6).

(8) A dual-mode drum brake assembly according to any one of the embodiments (1) through (7), further comprising biasing means for biasing the two brake shoes toward each other.

In the above embodiment (8), the two brake shoes are moved in the opposite directions away from each other against the biasing force of the biasing means when the service brake is applied. When the service brake is released, the brake shoes are returned to the non-operated positions under the biasing action of the biasing means, whereby the brake shoes are moved away from the brake drum.

(9) A dual-mode drum brake assembly according to the embodiment (8), wherein the biasing means includes: a first spring member for biasing portions of the two brake shoes which are closer to the wheel cylinder than to the anchor; and a second spring member for biasing portions of the two brake shoes which are closer to the anchor than to the wheel cylinder.

(10) A dual-mode drum brake assembly according to the embodiment (3), wherein the first brake shoe has a web substantially parallel to the plane of the backing plate, and the web, the intermediate lever and the parking lever are superposed on each other such that the web is interposed between the intermediate lever and the parking lever.

Since the intermediate lever and the parking lever which are substantially parallel to the first brake shoe are superposed on the the web of the first shoe such that the web of the first shoe is interposed between the intermediate and parking levers, these intermediate and parking levers can be accommodated well within an axial direction of a rim of the web of the first brake shoe, which rim extends from the web in the opposite directions perpendicular to the plane of the backing plate, that is, in the opposite axial directions of the drum brake assembly. According to the present arrangement, the axial dimension of the drum brake assembly as measured in the direction perpendicular to the backing plate can be made almost the same as that of the conventional drum brake assembly.

(11) A dual-mode drum brake assembly according to the embodiment (10), wherein the pivot axis of the parking lever is provided by a connecting pin for pivotal connection between the intermediate lever and the parking lever, and the web of the first brake shoe includes a portion which permits the connecting pin to extend therethrough and to move upon a pivotal movement of the intermediate lever about the pivot axis.

The intermediate lever and the parking lever may be pivotally connected to each other through a connecting member in the form of a pin, as in the above embodiment (11). In this case, the connecting pin should be movable relative to the first brake shoe in the direction parallel to the backing plate. To this end, the web of the first shoe should include a portion permitting the movement of the connecting pin relative thereto.

(12) A dual-mode drum brake assembly according to any one of the embodiments (3) through (11), further comprising a hold-down device for pivotally connecting the first brake shoe to the backing plate, wherein the hold-down device comprises a hold-down pin, and the first brake shoe includes a web substantially parallel to the plane of the backing plate, the web having a pin hole which permits the hold-down pin to extend, the hold-down device further comprising a hollow cylindrical collar fitted in the pin hole, the intermediate lever being pivotally connected to the web through the collar such that the intermediate lever is pivotable relative to the web about an axis of the collar.

In the drum brake assembly according to the above embodiment (12), the intermediate lever can be pivotally connected to the first brake shoe at a reduced cost.

(13) A dual-mode drum brake assembly according to any one of the embodiments (3) through (12), wherein the second strut is operatively associated at the opposite ends thereof with the intermediate lever and the second brake shoe, at respective two positions substantially lying on a plane which includes two points of abutting contacts of the second pair of adjacent ends of the two brake shoes with the opposite ends of the anchor and which is parallel an axial direction of the brake drum, the second strut extending between the above-indicated two positions while bypassing the anchor.

The distance between the non-operated positions of the two brake shoes on the side of the wheel cylinder may be increased with an increase in the amounts of wear of the brake shoes, by a suitable wear compensating mechanism such as the length adjusting mechanism as provided in the above embodiment (6) or (7). In this case, if the second strut is operatively associated at its opposite ends with the intermediate lever and the second brake shoe at the positions which are spaced apart from the above-indicated plane parallel to the axial direction of the brake drum, the amounts of clearance or play between the ends of the second strut and the intermediate lever and the second brake shoe in the direction of outward movements of the brake shoes upon brake application increase as the amounts of wear of the brake shoe increase, so that the required operating stroke of the parking lever is accordingly increased. In the above embodiment (13, the second strut extends while by-passing the anchor, between the two positions of operative association of the opposite ends of the second strut with the intermediate lever and the second brake shoe, and these two positions lie in the above-indicated plane which includes the two points of abutting contact of the two brake shoes with the anchor and which is parallel to the axis of the brake drum. In the present drum brake assembly, the points of solid engagement of the second strut with the second brake shoe and the intermediate lever do not significantly vary even if the distance between the end portions of the two brake shoes on the side of the wheel cylinder is increased by the wear compensating mechanism in response to an increase in the amounts of wear of the brake shoes. Therefore, the present arrangement makes it possible to avoid an increase in the required operating stroke of the parking lever.

(14) A dual-mode drum brake assembly according to claim 1, wherein the anchor has two abutting surfaces at the opposite ends for abutting contact with the second pair of adjacent ends of the two brake shoes, at least one of the two abutting surfaces having an angle angle of not larger than 7° with respect to a plane which passes centers of the wheel cylinder and the anchor and which is perpendicular to the plane of the backing plate.

When the dual-mode drum brake assembly acts as the leading/trailing brake, the two brake shoes are pivoted about the points of abutting contact with the anchor, and the linings of the brake shoes are forced against the inner circumferential surface of the brake drum. When the drum brake assembly acts as the duo-servo brake, the two brake shoes are moved away from each other by the link mechanism, and the torques produced by the tendency of the brake shoes to be dragged along with the brake drum cause one of the brake shoes to be moved away from the anchor while the other brake shoe is held in abutting contact with the anchor, whereby the torques produced by the dragging tendency are received by the anchor. Where the anchor angle of the abutting surfaces of the anchor is relatively large, the direction in which the surface pressure acts between the brake shoes and the brake drum varies depending upon whether the drum brake assembly acts as the leading/trailing brake or as the duo-servo brake. The parts of the brake shoe linings which wear due to frictional contact with the brake drum when the drum brake assembly acts as the duo-servo brake during parking brake application are generally different from those which wear when the drum brake assembly acts as the leading/trailing brake during service brake application. Accordingly, the brake shoe linings contact the brake drum at the different parts during the service brake application and the parking brake application, giving rise to a variation in the braking force produced.

Where the anchor angle is relatively small, the parts of the brake shoe linings which contact the brake drum when the parking brake is applied are relatively close to those when the service brake is applied, and the position at which the surface pressure between the linings and the brake drum is maximum during the parking brake application is almost the same as that during the service brake application. Accordingly, the variation in the braking force due to the different parts of contact and wear of the brake shoe linings is reduced with a decrease in the anchor angle. Thus, the relatively small anchor angle assures relatively high operating stability of the drum brake assembly when it acts as the parking brake or duo-servo brake. In this respect, the anchor angle is preferably 7° or smaller, and more preferably 5° or smaller. However, the anchor angle of 0° may cause a self-locking tendency. Therefore, the most preferred range of the anchor angle is within a range of 2–30°.

As described above, the reduction of the anchor angle is effective to assure that the position at which the surface pressure between the brake shoe linings and the brake drum is maximum during the parking brake application is almost the same as that during the service brake application. This object can be achieved by other means. For instance, it can be achieved by reducing the distance between the wheel cylinder and the strut through which the torque produced by the dragging tendency is transmitted between the two brake shoes. This strut may be the first strut provided in the embodiment (3) or (4) described above, or the third strut provided in the embodiment (5) described above. The reduction of the above-indicated distance results in a decrease in the distance between the point at which the force is transmitted from the strut to the brake shoe, and the point at which the force is transmitted from the wheel cylinder to the brake shoe. The above object may also be achieved by increasing the radial distance of the anchor from the axis of the drum brake assembly (from the axis of the drum brake). However, the reduction of the anchor angle is the easiest means for achieving the object.

Where one of the abutting surfaces of the anchor has the anchor angle of not larger than 7°, the above-indicated advantage is provided for the brake shoe in abutting contact with that abutting surface. When both of the abutting surfaces have the angle angles of not larger than 7°, the above-indicated advantage is provided for both of the brake shoes.

BRIEF DESCRIPTION OF THE DRAWINGS

The above and optional objects, features, advantages and technical and industrial significance of this invention will be better understood by reading the following detailed description of presently preferred modes of the invention, when considered in connection with the accompanying drawings, in which.

DETAILED DESCRIPTION OF THE PREFERRED MODES

Referring first to FIGS. 1–6, there will be described a dual-mode drum brake assembly constructed according to the first preferred mode of the present invention, for braking a rear right wheel of an automotive vehicle. A dual-mode drum brake assembly for braking a rear left wheel of the vehicle is symmetrical in construction with the drum brake assembly for the rear right wheel, with respect to the longitudinal centerline of the automotive vehicle.

Figure 1:
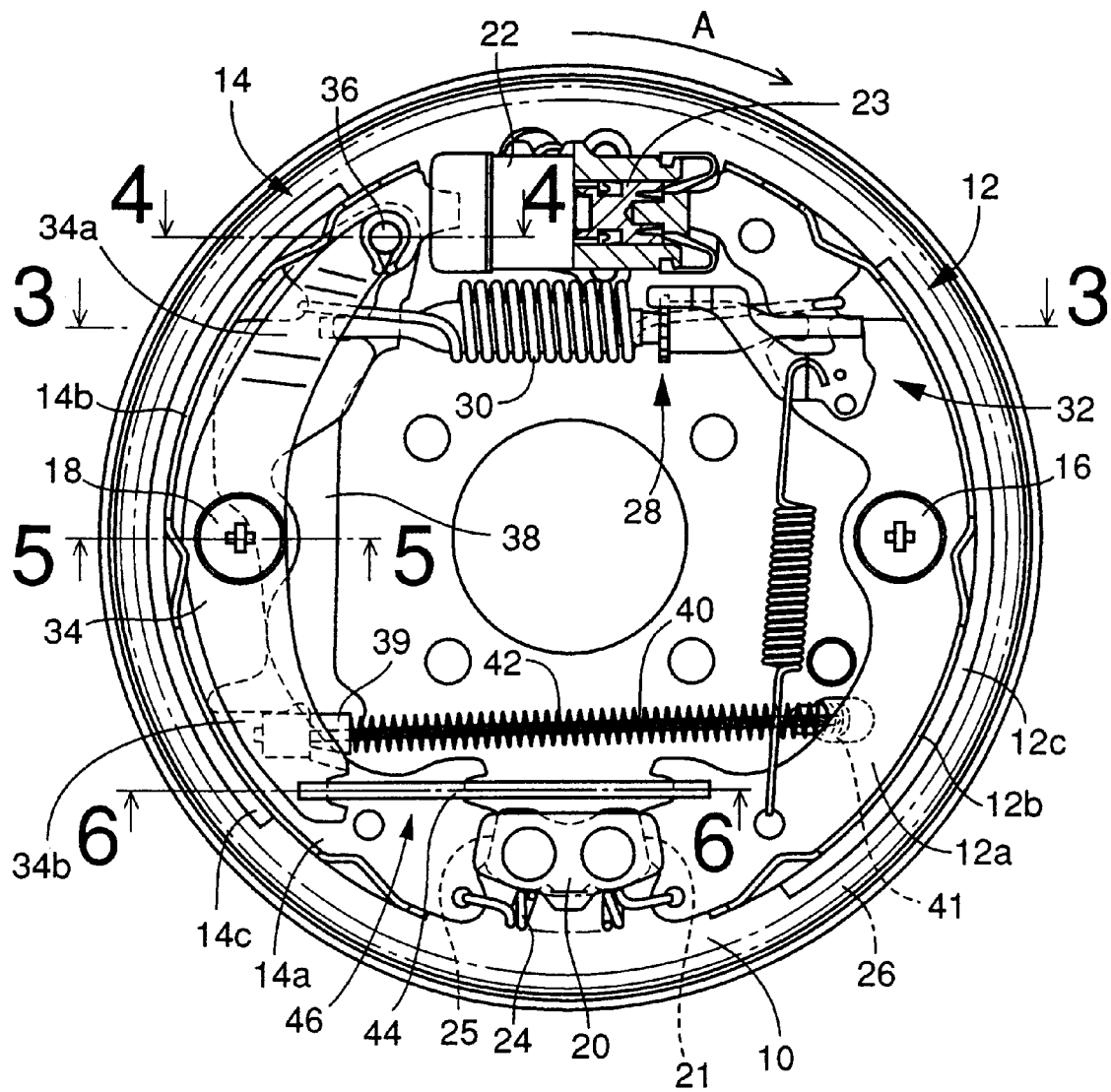
FIG. 1 is a partially cut-away front elevational view of a dual-mode drum brake assembly constructed according to one preferred mode of this invention.

As shown in FIG. 1, the drum brake assembly includes a backing plate 10 in the form of a generally circular disc which is fixed to the frame of the vehicle. A pair of arcuate brake shoes 12, 14 are supported by the backing plate 10 such that the two brake shoes 12, 14 are movable toward and away from each other in the left and right directions (as seen in FIG. 1) in a plane parallel to the plane (opposite major surfaces) of the backing plate 10. The brake shoes 12, 14 have: respective webs 12a, 14a parallel to the backing plate 10; respective rims 12b, 14b which are fixed to the arcuate outer periphery of the webs 12a, 14a and each of which cooperates with the corresponding web 12a, 14a to constitute a structure that is T-shaped in cross section; and respective linings 12c, 14c secured to the arcuate outer surfaces of the rims 12b, 14b. The brake shoes 12, 14 are provided with respective hold-down devices 16, 18 at their intermediate portions, and are movably attached to the backing plate 10 by the hold-down devices 16, 18.

Figure 5:
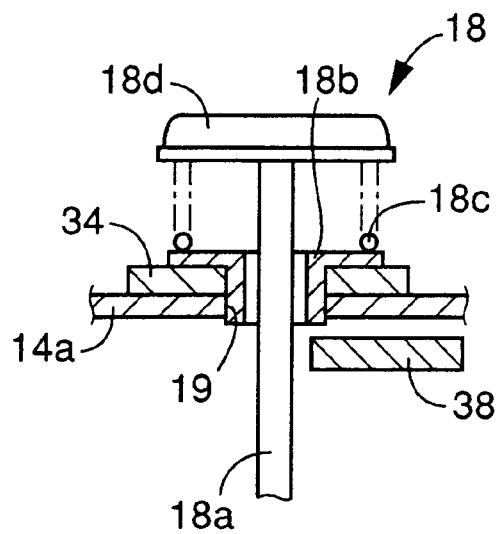
FIG. 5 is a cross sectional view taken along line 5—5 of FIG. 1.

As shown in FIG. 5, the hold-down device 18 for the shoe 14 includes: a hold-down pin 18a which extends perpendicularly to the backing plate 10 and which has a lower end portion engaging the backing plate 10; a hollow cylindrical collar 18b rotatably engaging the web 14a; a compression coil spring 18c; and a spring retainer 18d fixed to the upper end of the hold-down pin 18a. The web 14a has a pin hole 19 through which the hold-down pin 18a extends, and the collar 18b engages the pin hole 19. The web 14a is biased toward the backing plate 10 by a biasing force of the compression coil spring 18c. The hold-down device 16 for the brake shoe 12 is identical in construction with the hold-down device 18, except that the hold-down device 16 does not have a collar corresponding to the collar 18b.

The brake shoes 12, 14 are disposed such that the opposed lower end portions (as seen in FIG. 1) of the webs 12a, 14a are held in abutting contact with the opposite ends of an anchor 20 fixed to the backing plate 10. On the other hand, the other end portions, namely, the opposite upper end portions of the webs 12a, 14a are held in engagement with the respective opposite end portions of a wheel cylinder 22 also fixed to the backing plate 10. The anchor 20 is a floating type abutment block adapted to hold the webs 12a, 14a of the two brake shoes 12, 14 such that the webs 12a, 14a are movable away from the abutment block 20. Normally, the lower end portions of the webs 12a, 14a are held in abutting contact with opposite end faces or abutment surfaces 21, 25 of the anchor 20 under a biasing action of a tension coil spring 24 (second spring member) interposed between the webs 12a, 14a.

In the present mode of the invention, the abutment surfaces 21, 25 have an anchor angle of 5° with respect to a plane which passes intermediate points of the anchor 20 and wheel cylinder 22 and which is perpendicular to the plane of the backing plate 10. Therefore, the distance between the abutting surfaces 21, 24 of the anchor 22 increases in the downward direction as seen in FIG. 1.

The wheel cylinder 22 is a generally cylindrical member which is open at its opposite ends and which is disposed on a radially outer portion of the backing plate 10 such that the axial direction of the wheel cylinder 22 is tangential to the circumference of the backing plate 10, namely, is parallel to a straight line which is tangent to the circumference of the backing plate 10, at a point right above the above-indicated radially outer portion. That is, the axial direction of the wheel cylinder 22 is substantially parallel to the circumferential direction of the backing plate 10. The wheel cylinder 22 has a pair of pistons 23 which are outwardly movable from the opposite open ends indicated above. In FIG. 1, only one of the two pistons 23 is shown. The upper end portions of the webs 12a, 14a are held in engagement with the two pistons 23. When a service brake is applied to the rear right wheel, the wheel cylinder 22 is activated with a hydraulic pressure applied thereto by operation of a brake pedal or other service brake operating member, and the two pistons 23 are outwardly moved in the directions away from each other, whereby the upper end portions of the two brake shoes 12, 14 are moved in the right and left directions (as seen in FIG. 1) away from each other. Consequently, the two brake shoes 12, 14 are outwardly moved pivotally about the respective axes, namely, about the points of abutting contact with the anchor 20, so that the linings 12c, 14c are forced against the inner circumferential surface of a brake drum 26 rotating with the rear right wheel of the vehicle, and a braking force is generated for braking the wheel. Thus, the present drum brake assembly acts as a leading/trailing drum brake, upon service brake application during running of the vehicle. When the vehicle is running forward, the brake drum 26 is rotated in the clockwise direction indicated by arrow A in FIG. 1, so that the right side brake shoe 12 acts as the leading brake shoe while the left side brake shoe 14 acts as the trailing brake shoe. The drum brake assembly is installed in the same attitude as shown in FIG. 1, with the wheel cylinder 22 located at an upper portion of the assembly. In other words, the wheel cylinder 22 is fixed to an upper portion of the backing plate 10, while the anchor 20 is fixed to a lower portion of the backing plate 10. It is noted that the backing plate 10 is fixed to the vehicle frame, in opposed relationship with the opening of the brake drum 26.

A first strut 28 is operatively associated at its opposite ends with respective portions of the brake shoes 12, 14, more specifically, portions between the upper ends of the brake shoes 12, 14 and the hold-down devices 16, 18. These portions of the brake shoes 12, 14 are closer to the wheel cylinder 22 than to the anchor 20. The first strut 28 extends substantially in parallel with the axial direction of the wheel cylinder 22 in which the brake shoes 12, 14 are moved away from each other. To prevent removal of the first strut 28 from the brake shoes 12, 14 and to prevent displacement of the first strut 28 relative to the brake shoes 12, 14 in the vertical direction (as seen in FIG. 1) and in the direction perpendicular to the plane of the backing plate 10, the opposite end portions of the first strut 28 and the associated portions of the webs 12*a*, 14*a* have suitable cutouts or notches.

Figure 3:
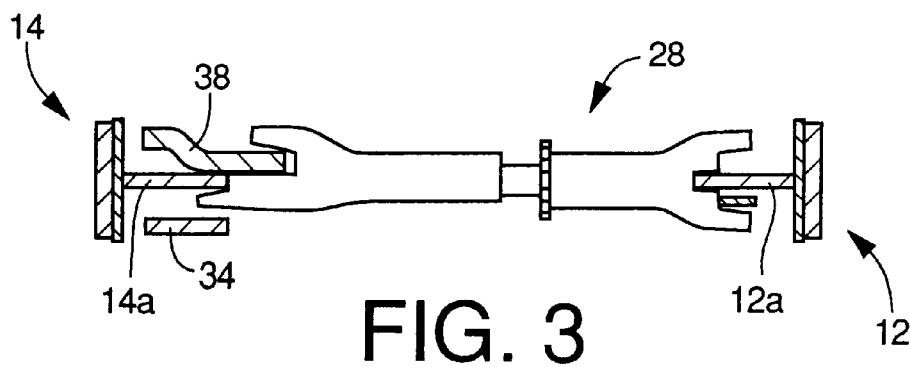
FIG. 3 is a cross sectional view taken along line 3—3 of FIG. 1.

An elastic member in the form of a return spring 30 (first spring member) is provided around the first strut 28, and is connected at its opposite ends to the brake shoes 12, 14. When the hydraulic pressure in the wheel cylinder 22 falls below a given level, the brake shoes 12, 14 are moved toward each other under a biasing action of the return spring 30, until the brake shoes 12, 14 are brought into abutting contact with the opposite ends of the first strut 28. Thus, the non-operated positions of the brake shoes 12, 14 are determined by abutting contact of the webs 12*a*, 14*a* with the first strut 28, as indicated in FIG. 3 (wherein the return spring 30 is not shown). The first strut 28 is longitudinally expansible and contractible by means of screw connection of two component parts thereof, so that the length of the first strut 28 is automatically adjusted by a shoe wear compensating mechanism 32. Described more particularly, the shoe wear compensating mechanism 32 operates the screw connection to expand the first strut 28 or increase the length of the first strut 28 as the amount of movement of the brake shoe 12 from the non-operated position to the operated position is increased due to wear of the lining 12*c*. That is, the shoe wear compensating mechanism 32 is adapted to increase the distance between the non-operated positions of the two brake shoes 12, 14 so that the clearance between the linings 12*c*, 14*c* and the inner circumferential surface of the brake drum 26 is held at a predetermined optimum value, irrespective of the increasing amount of wear of the linings 12*c*, 14*c*.

Figure 6:
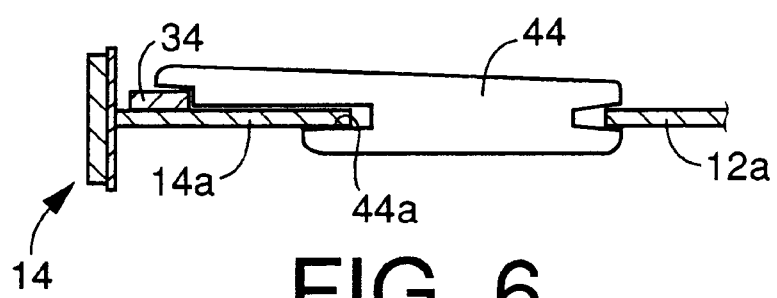
FIG. 6 is a cross sectional view taken along line 6—6 of FIG. 1.

The brake shoe 14 is provided with an intermediate lever 34 which is parallel to the web 14*a*. The intermediate lever 34 is superposed on one of opposite surfaces of the web 14*a* remote from the backing plate 10, as shown in FIG. 6, and engages the collar 18*b* of the hold-down device 18, as shown in FIG. 5, such that the intermediate lever 34 is pivotable relative to the collar 18*b*. The web 14*a* and the intermediate lever 34 are biased toward the surface of the backing plate 10 under a biasing force of the compression coil spring 18*c* of the hold-down device 18. Like the hold-down pin 18*a*, the collar 18*b* has a centerline perpendicular to the plane of the backing plate 10, and the intermediate lever 34 is connected at an intermediate portion thereof to an intermediate portion of the brake shoe 14, pivotally about an axis which is the centerline of the collar 18*b* perpendicular to the backing plate 10. As shown in FIG. 1, the intermediate lever 34 has a first arm 34*a* extending from its pivot axis toward the wheel cylinder 22, and a second arm 34*b* extending from its pivot axis toward the anchor 20. The free end portion of the first arm 34*a* is located near the wheel cylinder 22, and is operatively connected to a parking lever 38 such that the parking lever 38 is pivotable relative to the first arm 34*a* about an axis perpendicular to the backing plate 10.

Figure 2:
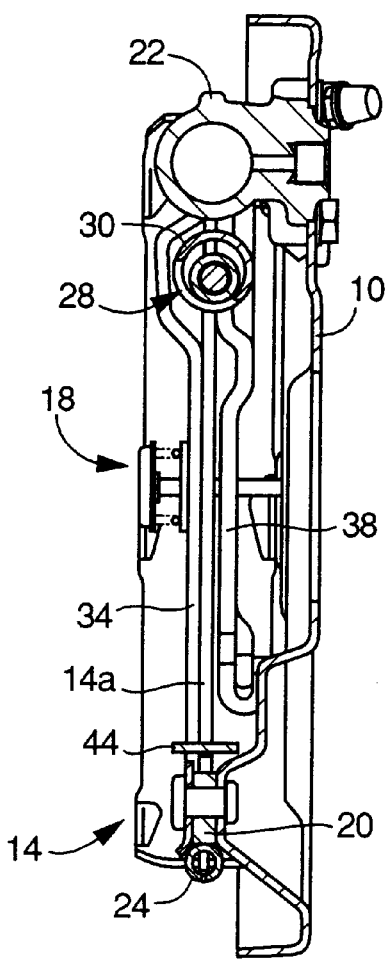
FIG. 2 is an elevational view in vertical cross section of the drum brake assembly of FIG. 1.
Figure 4:
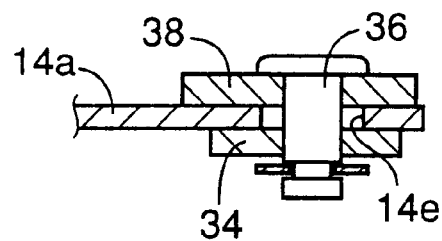
FIG. 4 is a cross sectional view taken along line 4—4 of FIG. 1.

The parking lever 38 extends in parallel to the web 14*a* of the brake shoe 14, and is disposed on one side of the web 14*a* remote from the intermediate lever 34. That is, the web 14*a* is interposed between the intermediate lever 34 and the parking lever 38, as shown in FIG. 2. In other words, the parking lever 38, web 14*a* and intermediate lever 34 are superposed on each other in the order of description. To a portion of the parking lever 38 closer to the wheel cylinder 22 than to the anchor 20, there is fixed a connecting member in the form of a pin 36 as shown in FIG. 4, which is parallel with the collar 18*b* and perpendicular to the plane of the backing plate 10. The web 14*a* has a hole 14*e* through which the connecting pin 36 extends for pivotal engagement with the free end portion of the first arm 34*a* of the intermediate lever 34, as also shown in FIG. 4. Thus, the parking lever 38 is connected to the intermediate lever 34 pivotally thereto about the centerline of the connecting pin 36. Namely, the centerline of the connecting pin 36 functions as a pivot axis of the parking lever 38. A portion of the parking lever 38 between the pivot axis and the free end is held in engagement with a notch formed in the first strut 28, as shown in FIG. 3. When the drum brake assembly is not operated, there exists a small clearance between the parking lever 38 and the first strut 28. When parking brake is applied, this clearance is eliminated during a pivotal movement of the parking lever 38 about the pin 36.

The parking lever 38 has a free end portion 39 remote from the connecting pin 36. This free end portion 39 is located near the free end of the second arm 34*b* of the intermediate lever 34, and is connected to a parking brake operating cable 40. The free end portion 39 will be referred to as "cable fixing portion".

As is apparent from FIG. 4, the hole 14*e* through which the connecting pin 36 of the parking lever 38 extends has a diameter considerably larger than the diameter of the connecting pin 36. Therefore, the intermediate lever 34 and the parking lever 38 are permitted to be pivoted about the collar 18*b* of the hold-down device 18. In the present embodiment, the brake shoe 14 to which the intermediate lever 34 is operatively connected is referred to as "first brake shoe", while the brake shoe 12 is referred to as "second brake shoe". The cable 40 fixed to the cable fixing portion 39 of the parking lever 38 extends out of the drum brake assembly, through a cable aperture 41 formed through the backing plate 10. The cable aperture 41 is located at a lower portion of the backing plate 10 relatively near to the anchor 20 and adjacent the second brake shoe 12. The cable 40 further extends in a direction toward the front bumper of the vehicle, and is connected to a suitable parking brake operating member (not shown) such as a parking brake lever or foot pedal.

When the parking brake operating member is operated to its operated position, the cable 40 is pulled, and the parking lever 38 is pivoted about the connecting pin 36 in the clockwise direction, with the cable fixing portion 39 being moved toward the second brake shoe 12. When the parking brake operating member is returned to its non-operated position, the parking lever 38 is pivoted in the clockwise direction and returned to the non-operated position of FIG. 1, under the biasing action of a return spring 42.

A second strut 44 is associated at its opposite ends with the free end portion of the second arm 34b of the intermediate lever 34 and a portion of the second brake shoe 12 which is closer to the anchor 20 than to the wheel cylinder 22. The second strut 44 extends in parallel with the first strut 28, and cooperates with the first strut 28 and the intermediate lever 34 to constitute a link mechanism 46. As shown in FIG. 6, the second strut 44 has a notch 44a for preventing an interference of the second strut 44 with the web 14a of the first brake shoe 14, and permitting the lower end portions of the two brake shoes 12, 14 to be held in abutting contact with the anchor 20 under the biasing force of the tension coil spring 24. The opposite end portions of the second strut 44, and the webs 12a, 14a and the intermediate lever 34 have suitable cutouts or notches for preventing removal of the second strut 44 and displacement of the second strut 44 relative to the brake shoes 12, 14 in the vertical direction (as seen in FIG. 1) and in the axial direction perpendicular to the backing plate 10. Between the intermediate lever 34 and second brake shoe 12 and the second strut 44, there exist small clearances in the longitudinal direction of the second strut 44 when the parking brake is not applied to the wheel. The second strut 44 may be held in abutting contact at its opposite ends with the web 12a of the second brake shoe 12 and the intermediate lever 34, under a biasing action of a tension coil spring or springs.

In the present dual-mode drum brake assembly, a hydraulic pressure generated by an operation of the service brake operating member is applied to the wheel cylinder 22, so that the two pistons 23 are moved outwardly in the opposite directions away from each other. As a result, the two brake shoes 12, 14 are pivoted about their lower ends held in abutting contact with the anchor 20, and the upper end portions of the two brake shoes 12, 14 near the wheel cylinder 22 are moved outwardly in the right and left directions as seen in FIG. 1, so that the linings 12c, 14c are forced against the inner circumferential surface of the brake drum 26, so as to produce a braking force. Thus, the drum brake assembly acts as the leading/trailing brake.

Figure 7:
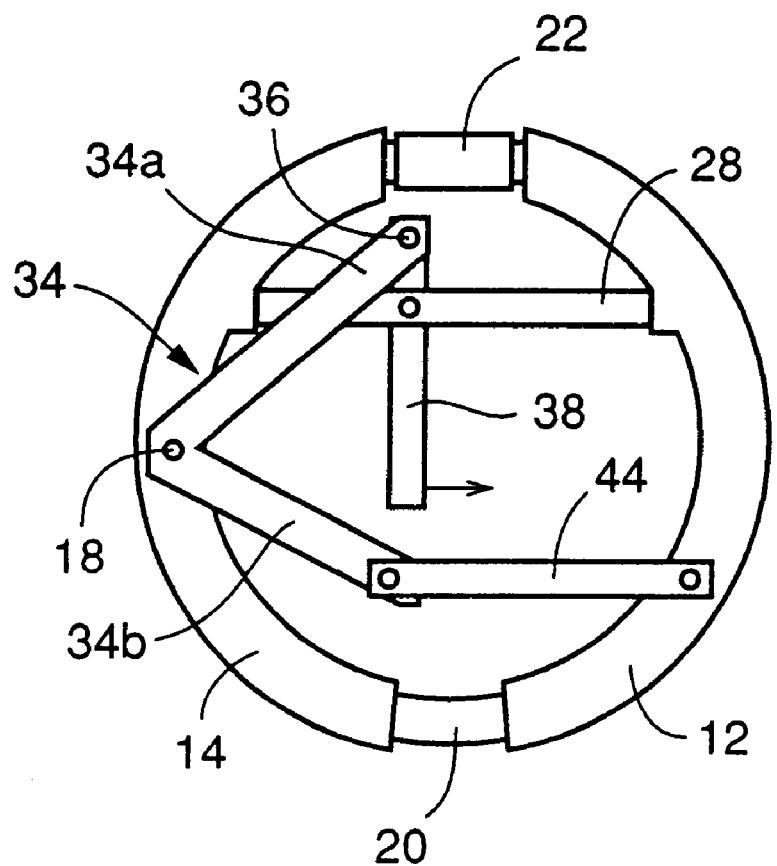
FIG. 7 is a schematic view for explaining an operation of the drum brake assembly upon parking brake application to an automotive vehicle.

When the parking brake operating member is operated after the vehicle is stopped with the service brake applied as described above, the brake shoes 12, 14 are forced in the directions toward the inner circumferential surface of the brake drum 26. A transfer of forces upon operation of the parking brake operating member will be explained by reference to FIG. 7, wherein the various components of the drum brake assembly are schematically shown. In FIG. 7, connections of the components which engage each other through notches upon operation of the parking brake operating member are indicated as pin connections. Arrow in FIG. 7 indicates a direction in which the force acts on the parking lever 38 when the parking brake operating member is operated.

Upon operation of the parking brake operating member, the parking lever 38 is pivoted toward the second brake shoe 12, about the centerline of the connecting pin 36, and is brought into solid engagement with the first strut 28. Consequently, the first strut 28 is moved so as to force the upper end portion of the second brake shoe 12 in the outward direction of the drum brake assembly (in the right direction as seen in FIG. 7). A reaction force acts on the connecting pin 36 in the outward direction (in the left direction as seen in FIG. 7), causing a torque to act on the intermediate lever 34 so as to pivot it in the counterclockwise direction about the collar 18b of the hold-down device 18. As a result, a force is transmitted from the intermediate lever 34 to the second strut 44, causing the lower end portion of the brake shoe 12 to be forced in the outward direction (in the right direction as seen in FIG. 7), while a reaction force acts on the lower end portion of the intermediate lever 34. The reaction forces acting on the upper and lower end portions of the intermediate lever 34 cause the entirety of the intermediate lever 34 to be forced in the outward direction, causing the first brake shoe 14 to be moved in the outward direction (in the left direction as seen in FIG. 7) through the collar 18b of the hold-down device 18. Thus, the brake shoes 12, 14 are moved in the opposite outward directions away from each other by the two struts 28, 44, intermediate lever 34 and parking lever 38.

In this case where the parking brake operating member is operated while the service brake remains applied, the brake shoes 12, 14 are forced against the brake drum 26 by the pistons 23 of the wheel cylinder 22 while the lower end portions of the brake shoes 12, 14 are held in abutting contact with the anchor 20. Even if a drive torque acts on the vehicle wheel after the service brake operating member is returned to its non-operated position, the brake shoes 12, 14 are held forced against the brake drum 26 with the lower end portions thereof held in abutting contact with the anchor 20, unless the drive torque is larger than the braking torque acting on the vehicle brake drum 26 when the drum brake assembly is acting as the leading/trailing brake. If the drive torque exceeds the braking torque, the brake drum 26 is rotated, causing the drum brake assembly to act as the duo-servo brake.

If a large torque acts on the brake drum 26 in the forward direction indicated at A in FIG. 1, the brake shoes 12, 14 tend to be dragged along with the brake drum 26 rotating in the forward direction, the brake shoe 12 is held in abutting contact with the anchor 20, while the brake shoe 14 is rotated with the brake drum 26 and moved away from the anchor 20. The torque acting on the first brake shoe 14 is transmitted directly to the first strut 28, and the torque is transmitted from the first strut 28 directly to the second brake shoe 12. Thus, the second brake shoe 12 receives the torque directly from the brake drum 26 and from the first brake shoe 14 through the first strut 28. These torques are transmitted from the second brake shoe 12 to the anchor 20. Thus, the brake shoe 12 produces a sufficiently large braking force owing to a servo effect, whereby the rotating wheel is firmly braked. In this case, the present drum brake assembly acts as a duo-servo brake wherein the leading side (left side as seen in FIG. 1) brake shoe 14 functions as a primary brake shoe while the trailing side (right side as seen in FIG. 1) brake shoe 12 functions as a secondary brake shoe.

As described above, the torques acting on the two brake shoes 12, 14 due to the dragging tendency caused by frictional contact with the rotating brake drum 26 cause a transition of the drum brake assembly from the leading/trailing brake system to the duo-servo brake system. The lever ratios of the intermediate lever 34 and parking lever 38 and the dimensions of the associated components are determined so as to substantially prevent a movement of the cable fixing portion 39 of the parking lever 38 when the above transition occurs. Therefore, the transition to the duo-servo system is effected without an increase or decrease in the tensile force acting on the cable 40.

It is also noted that the diameter of the hole 14e of the web 14a of the brake shoe 14 is determined so as to prevent an interference of the web 14a with the connecting pin 36 when the drum brake assembly acts as the duo-servo brake.

When the parking brake operating member is operated without the service brake application, the upper and lower portions of the brake shoes 12, 14 are forced toward the brake drum 26, and the upper or lower portions that are more easily moved toward the brake drum 26 than the other portions are forced against the inner circumferential surface of the brake drum 26. If the brake drum 26 is rotated in the forward or reverse direction, large rotating torques act on the brake shoes 12, 14 due to dragging caused by frictional contact with the brake drum 26, so that either the brake shoe 12 or the brake shoe 14 is brought into abutting contact with the anchor 20. Thus, the drum brake assembly acts as the duo-servo brake.

In the present drum brake assembly wherein the parking lever 38 is disposed so as to generally extend in parallel with the first brake shoe 14, the parking lever 38 can be given a length large enough to provide a sufficient operating stroke at the cable fixing portion 39. This arrangement makes it possible to increase the ratio of the effective portion of the operating stroke that can be used to move the cable fixing portion 39, while minimizing the required pivoting angle of the parking lever 38. Further, the parking lever 38 is pivotally connected to the intermediate lever 34, at a point close to the upper end portion of the web 14a of the first brake shoe 14 and relatively close to the wheel cylinder 22, such that the parking lever 38 is pivotable relative to the intermediate lever 34 about the pivot axis perpendicular to the plane of the backing plate 10, namely, about the centerline of the connecting pin 36. This arrangement permits an increased degree of freedom of design relating to the lever ratio of the drum brake assembly, that is, a ratio of the distance between the connecting pin 36 and the cable fixing portion 39 to the distance between the connecting pin 36 and the point of solid engagement of the parking lever 38 with the first strut 28. In other words, the present drum brake assembly can be easily given a sufficiently high lever ratio, so that the parking brake can be applied with an operating force which is almost the same as in an ordinary leading/trailing type drum brake assembly wherein the parking brake also acts as a leading/trailing brake. However, the parking brake force produced by the present drum braking assembly is larger than that in the conventional leading/trailing drum brake assembly, by an amount corresponding to the duo-servo function. In other words, the required braking force can be obtained with a reduced operating force applied to the parking brake operating member, so that the force acting on the cable 40 upon the parking brake application is accordingly reduced, and the required strength of the cable 40 is reduced. Consequently, the present drum brake assembly can be manufactured with a reduced weight and at a reduced cost.

Since the parking lever 38 is pivotally connected to the intermediate lever 34 at the point near the upper end of the first brake shoe 14 adjacent to the wheel cylinder 22, as described above, the cable fixing portion 39 of the parking lever 38 can be easily located at a position comparatively near the anchor 20. Therefore, the cable 40 can be easily positioned as in the conventional leading/trailing type drum brake assembly in which the parking brake also acts as the leading/trailing brake.

Further, the intermediate lever 34 and the parking lever 38 are disposed in parallel with the first brake shoe 14 such that these two levers 34, 38 and the web 14a of the brake shoe 14 are almost superposed on each other and such that the web 14a is interposed between the two levers 34, 38. In this arrangement, the two levers 34, 38 can be well accommodated within the axial dimension of the rim 14b which extends from the web 14a on the opposite sides in the axial direction of the brake drum 26 perpendicular to the plane of the backing plate 10. Therefore, the present drum brake assembly can be manufactured with its axial direction almost equal to that of the conventional drum brake assembly.

Referring to FIGS. 8 through 11, there will be described a second preferred mode of this invention.

In the drum brake assembly according to the present mode of the invention, a parking lever 60 is operatively connected to the brake shoe 14, while an intermediate lever 62 is operatively connected to the brake shoe 12. The brake shoe 12 to which the intermediate lever 62 is connected is referred to as the first brake shoe, while the brake shoe 14 is refereed to as the second brake shoe. In FIGS. 8–11, the same reference numerals are used to identify the elements having substantially the same functions in the first mode of FIGS. 1–7, and redundant description of these elements will not be provided in the interest of simplification of the description.

The parking lever 60 extends along the second brake shoe 14, and is disposed on one of the opposite sides of the web 14a of the brake shoe 14, which is remote from the backing plate 10. The upper end portion of the parking lever 60 extends to a point close to the wheel cylinder 22, and is operatively connected to the upper end portion of the web 14a on the side of the wheel cylinder 22. The web 14a has a hole formed therethrough, and a connecting member in the form of a connecting pin 64 fixedly fitted in the hole such that the connecting pin 64 extends in the direction perpendicular to the backing plate 10. The end portion of the pin 64 which protrudes from the web 14a pivotally engages a hole formed through the upper end portion of the parking lever 60, such that the parking lever 60 is pivotable relative to the web 14a, about the centerline of the pin 64 or the hole.

Figure 8:
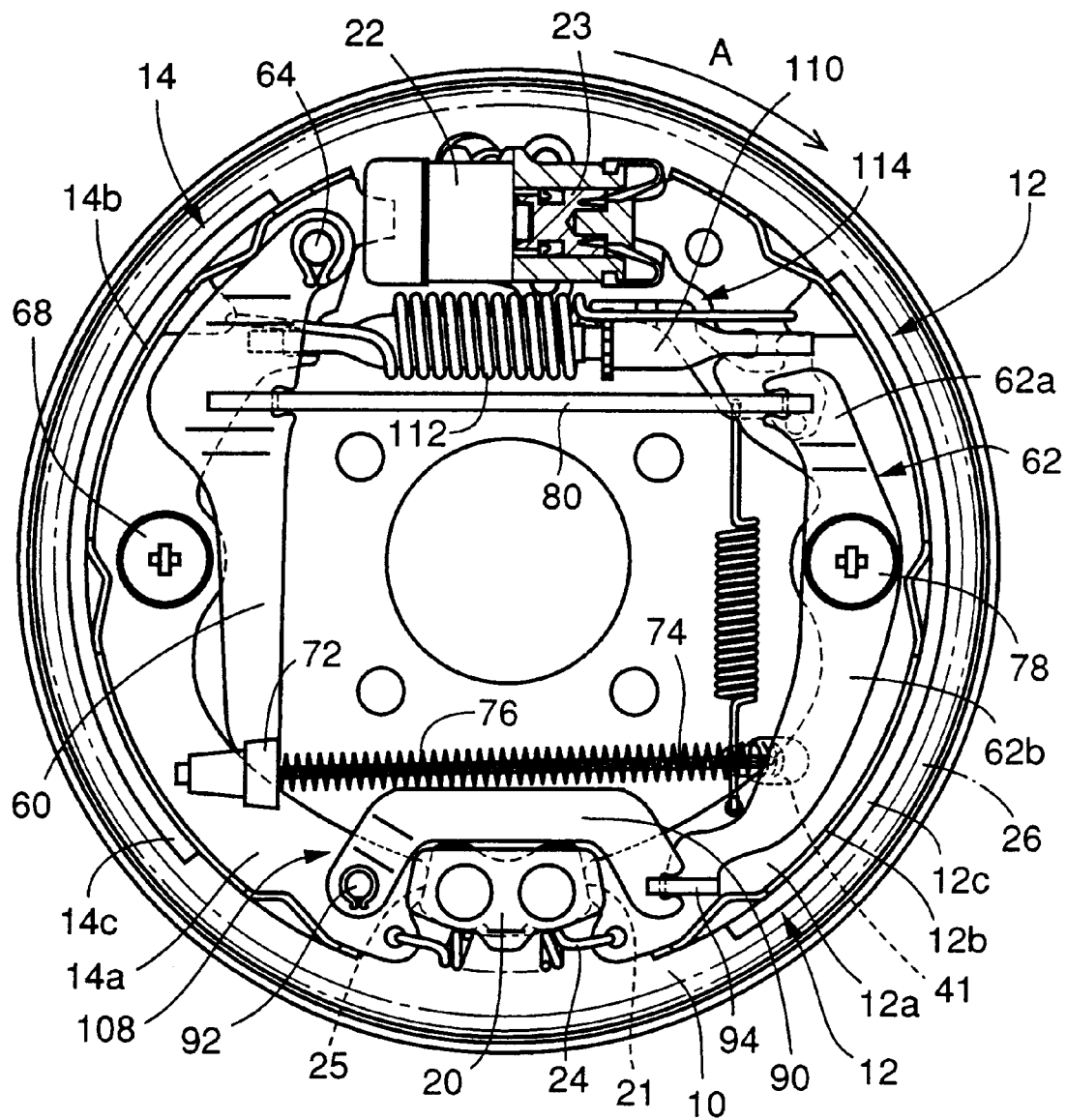
FIG. 8 is a partially cut-away front elevational view partially in cross section showing a dual-mode drum brake assembly according to another preferred mode of this invention.
Figure 9:
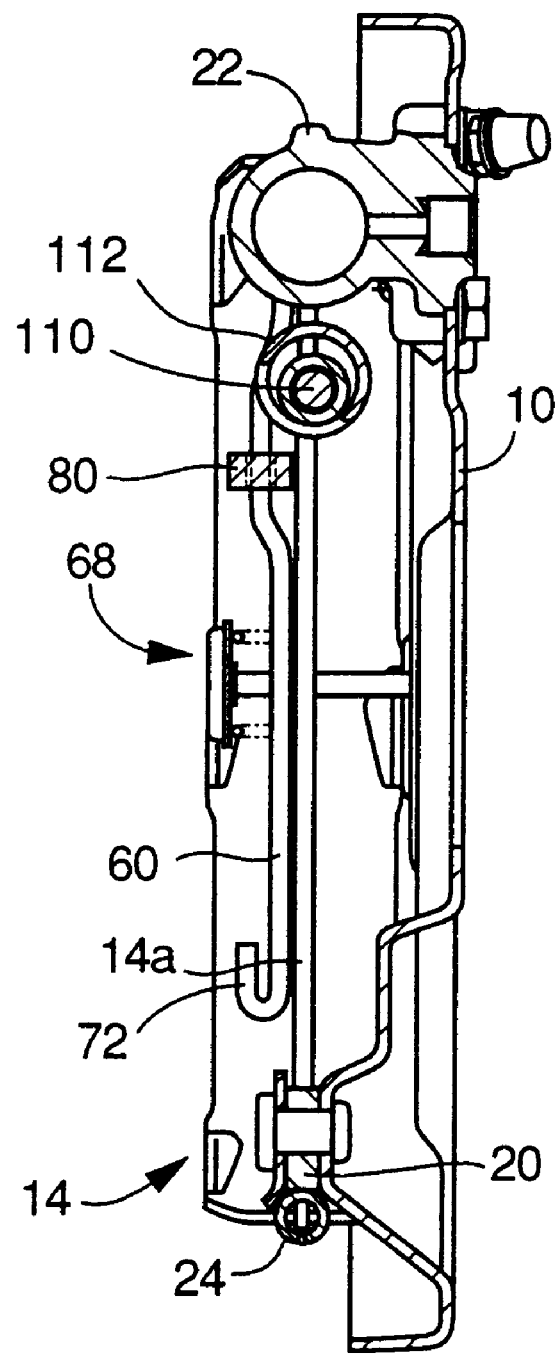
FIG. 9 is an elevational view in vertical cross section of the drum brake assembly of FIG. 8.

The parking lever 60 extends aside a hold-down device 68, and the lower end portion of the parking lever 60 is located near the anchor 20. The hold-down device 68 is identical in construction with the hold-down device 18 in the first mode of the invention. The parking lever 60 includes a cable fixing portion 72 at its lower end portion, and a parking brake operating cable 74 is fixed at one end thereof to the cable fixing portion 74. The cable 74 is positioned to extend through the cable aperture 41 formed at a lower portion of the backing plate 10, and is fixed at the other end to the parking brake operating member, as in the first mode of the invention. Reference numeral 76 denotes a return spring functioning as biasing means in the form of an elastic member. The return spring 76 returns the parking lever 60 to its original or non-operated position of FIG. 8 when the parking brake operating member is returned from the operating position to the non-operated position. The cable 74 is provided with a length adjusting device (not shown), so that the non-operated position of the parking lever 60 is adjusted by adjusting the length of the cable 74. In FIG. 9, the cable 74 and the return spring 76 are not shown.

Figure 10:
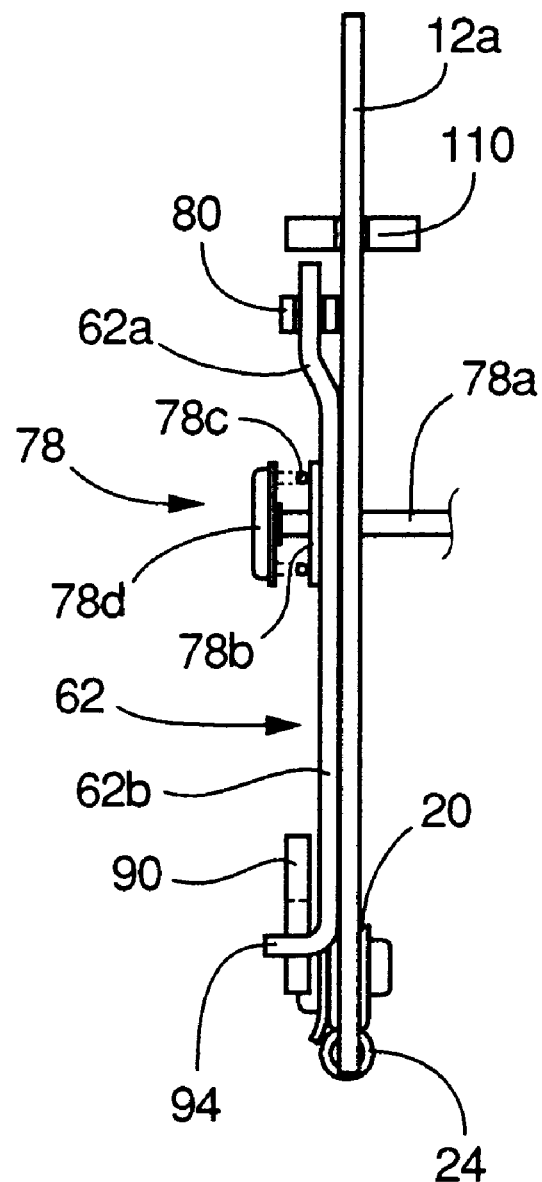
FIG. 10 is a side view showing an intermediate lever together with a brake shoe of the drum brake assembly of FIG. 8.

The intermediate lever 62 extends along the web 12a of the second brake shoe 14, and is disposed on the side of the web 12a of the first brake shoe 12 which is remote from the backing plate 10. The intermediate lever 62 is operatively connected to an intermediate portion of the brake shoe 12. The brake shoe 12 is retained to the backing plate 10 by a hold-down device 78, which is identical in construction with the hold-down device 18. As shown in FIG. 10, the hold-down device 78 includes a hold-down pin 78a, a collar 78b, a compression coil spring 78c and a spring retainer 78d. The intermediate portion of the intermediate lever 62 engages the collar 78b such that the intermediate lever 62 is pivotable relative to the web 12a about the centerline of the collar 78b perpendicular to the plane of the backing plate 10. The intermediate lever 62 includes a first arm 62a extending from the intermediate portion toward the wheel cylinder 22, and a second arm 62b extending from the intermediate portion toward the anchor 20.

A first strut 80 is operatively associated at its opposite ends with the first arm 62a of the intermediate lever 62 and a portion of the parking lever 60 between its pivot axis (connecting pin 64) and its free end. The opposite end portions of the first strut 80, the first arm 62a of the intermediate lever 62 and the parking lever 60 have notches or cutouts formed so as to prevent removal of the first strut 80 from the levers 60, 62 and displacement of the first strut 80 in the vertical direction (as seen in FIG. 8) and in the axial direction perpendicular to the plane of the backing plate 10. When the parking lever 60 is placed in the non-operated position with the parking brake operating member placed in the non-operated position, there exist clearances between the opposite end portions of the first strut 80 and the first arm 62a and the parking lever 60.

A second strut 90 is operatively associated at its opposite ends with the second arm 62a of the intermediate lever 62 and the lower end portion of the second brake shoe 14 on the side of the anchor 20. The second strut 90 is pivotally connected at one end thereof to a connecting member in the form of a connecting pin 92 fixed to the lower end portion of the brake shoe 14, such that the second strut 90 is pivotable relative to the brake shoe 14 about the centerline of the connecting pin 92 which is perpendicular to the plane of the backing plate 10. The centerline of the connecting pin 92 lies on a straight line which passes the points of abutting contact of the two brake shoes 12, 14 with the anchor 20. The web 14a of the second brake shoe 14 has a hole in which the connecting pin 92 is fixedly fitted, and the end portion of the second strut 90 pivotally engages the portion of the pin 92 which protrudes from the web 14a.

The second strut 90 is operatively connected to the web 14a without a clearance therebetween in the direction perpendicular to the backing plate 10. The second strut 90 is bent near the above-indicated one end, away from the web 14a in the axial direction perpendicular to the backing plate 10, and has an intermediate portion extending from the bent portion such that the intermediate straight portion is parallel with the backing plate 10 and located inwardly of the anchor 20. The second strut 90 has curved portions between the intermediate straight portion and the opposite end portions which are operatively associated with the two brake shoes 14, 12, as seen in the plane of FIG. 8. That is, the second strut 90 is curved to by-pass the anchor 20. As shown in FIG. 10, the lower end portion of the second arm 62b of the intermediate lever 62 has an engaging portion 64 which is perpendicular to the backing plate 10 and which lies on the above-indicated straight line passing the points of abutting contact of the two brake shoes 12, 14 with the anchor 20. The engaging portion 94 of the intermediate lever 62 and the corresponding end portion of the second strut 90 have notches or cutouts which engage each other so as to prevent removal of the second strut 90 from the engaging portion 94 and displacement of the second strut 90 in the vertical direction (as seen in FIG. 8) and in the axial direction perpendicular to the plane of the backing plate 10. The point of engagement of the second strut 90 and the engaging portion 94 lies on the straight line passing the points of abutting contact of the brake shoes 12, 14 with the anchor 20. When the braking brake operating member is not operated, there exists a clearance between the engaging portion 94 and the second strut 90 in the longitudinal direction of the second strut 90, so that the first brake shoe 12 is permitted to come into abutting contact with the anchor 20 when the parking brake operating member is operated.

Between the upper end portions of the brake shoes 12, 14 which are close to the wheel cylinder 22, a third strut 110 extends in parallel with the first strut 80. This third strut 110 cooperates with the first and second struts 80, 90 and the intermediate lever 62 to constitute a link mechanism 108. The opposite end portions of the third strut 110 and the webs 12a, 14a have notches or cutouts formed so as to prevent removal of the third strut 110 from the brake shoes 12, 14 and displacement of the third strut 110 in the vertical direction (as seen in FIG. 8) and in the axial direction perpendicular to the backing plate 10. The parking lever 60 is bent in a direction away from the web 24a, at a portion thereof associated with the first strut 80, as shown in FIG. 9. It is also noted that the bent portion of the parking lever 60 does not interfere with the third strut 110.

An elastic member in the form of a return spring 112 (first spring member) is disposed around the third strut 110, and is connected at its opposite ends to the brake shoes 12, 14. When the hydraulic pressure in the wheel cylinder 22 is lowered, the upper end portions of the brake shoes 12, 14 are moved inwardly toward each other under the biasing action of the return spring 112, and brought into solid engagement with the opposite ends of the third strut 110, whereby the brake shoes 12, 14 are placed in the non-operated position. The third strut 110 is expansible and contractible by means of screw connection of two component parts thereof, so that the length of the third strut 110 is automatically adjusted by a shoe wear compensating mechanism 114, so that the length of the third strut 28 is increased to increase the distance between the non-operated positions of the two brake shoes 12, 14, as the amount of movement of the first brake shoe 12 from the non-operated position to the operated position is increased due to wear of the lining 12c.

As indicated above, the non-operated positions of the brake shoes 12, 14 are shifted outwardly toward the brake drum 26 with an increase in the length of the third strut 110 by the shoe wear compensating mechanism 114 as the amount of movement of the brake shoe 12 from the non-operated position to the operated position increases due to the wear of the linings 12c, 14c. Accordingly, the non-operated positions of the intermediate lever 62 and the parking lever 60 are shifted outwardly, so that the distance between these two levers 62, 60 is increased, with a result of an increase in the amounts of clearances between the levers 62, 60 and the opposite end portions of the first strut 80. To prevent this increase in the amounts of clearances and a consequent increase in the operating stroke of the parking lever 60, the length adjusting mechanism indicated above is operated to reduce the length the cable 74 to shift the non-operated position of the parking lever 50 outwardly toward the first brake shoe 12, so that the amounts of the clearances between the first strut 80 and the levers 62, 60 are maintained within an optimum range, irrespective of the shifting of the non-operated positions of the brake shoes 12, 14 by the shoe wear compensating mechanism 114.

In the present drum brake assembly constructed as described above according to the second preferred mode of this invention, an operation of the service brake operating member will cause the brake shoes 12, 14 to be moved outwardly away from each other, forcing the linings 12c, 14c against the inner circumferential surface of the brake drum 26, as in the first mode of the invention. When the parking brake operating member is operated after the vehicle is stopped with the service brake being applied, a force transmitted to the parking lever 60 through the cable 74 is transferred as explained below by reference to the schematic view of FIG. 11.

Figure 11:
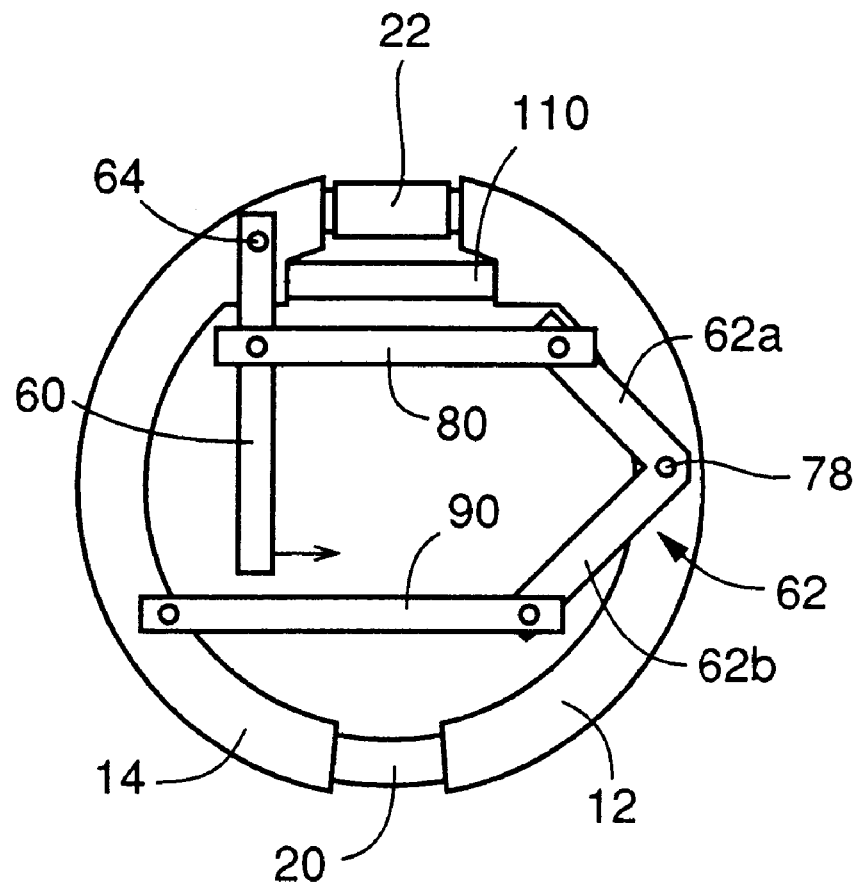
FIG. 11 is a schematic view for explaining an operation of the drum brake assembly upon parking brake application to the vehicle.

With the force acting on the parking lever 60 upon operation of the parking brake operating member, the parking lever 60 is pivoted toward the first brake shoe 12, about the connecting pin 64, and is brought into solid engagement with the first strut 80, causing the first strut 80 to be moved in the direction toward the intermediate lever 62. As a result, a torque acts on the intermediate lever 62 in the clockwise direction as seen in FIG. 11, whereby the first arm 62a is forced in the outward direction. A reaction force acts on the connecting pin 64, causing the upper portion of the second brake shoe 14 to be moved in the outward direction. At the same time, a force is transmitted from the intermediate lever 62 to the lower portion of the second brake shoe 14 via the second strut 90, so that the lower portion of the brake shoe 14 is moved in the outward direction. A reaction force acts on the lower portion of the intermediate lever 62 in the outward direction. With this reaction force and the force received from the first strut 80, the entirety of the intermediate lever 62 is forced in the outward direction, forcing the first brake shoe 12 outward via the collar 78b of the hold-down device 78.

In this case where the parking brake operating member is operated while the service brake remains applied, the brake shoes 12, 14 are forced against the brake drum 26 by the pistons 23 of the wheel cylinder 22 while the lower end portions of the brake shoes 12, 14 are held in abutting contact with the anchor 20. Even if a drive torque acts on the vehicle wheel after the service brake operating member is returned to its non-operated position, the brake shoes 12, 14 are held forced against the brake drum 26 with the lower end portions thereof held in abutting contact with the anchor 20, unless the drive torque is larger than the braking torque acting on the vehicle brake drum 26 when the drum brake assembly is acting as the leading/trailing brake. If the drive torque exceeds the braking torque, the brake drum 26 is rotated, causing the drum brake assembly to act as the duo-servo brake.

If a large torque acts on the brake drum 26 in the forward direction indicated at A in FIG. 8, the brake shoes 12, 14 tend to be dragged along with the brake drum 26 rotating in the forward direction, the brake shoe 12 is held in abutting contact with the anchor 20, while the brake shoe 14 is rotated with the brake drum 26 and moved away from the anchor 20. The torque acting on the first brake shoe 14 is transmitted directly to the first strut 28 through the third strut 110. Thus, the second brake shoe 12 receives the torque directly from the brake drum 26 and from the first brake shoe 14 through the first strut 28. These torques are transmitted from the second brake shoe 12 to the anchor 20.

As in the first mode of the invention, the lever ratios of the parking lever 60 and the intermediate lever 62 and the dimensions of the associated components are determined so as to substantially prevent a movement of the cable fixing portion 72 of the parking lever 60 upon transition of the drum brake assembly from the leading/trailing brake system to the duo-servo brake system.

When the parking brake operating member is operated without the service brake application, the brake shoes 12, 14 are forced against the brake drum 26. If large torques act on the brake shoes 12, 14 due to the dragging tendency upon rotation of the brake drum 26 in the forward or reverse direction, the brake shoe 12 or 14 is brought into abutting contact with the anchor 20, whereby the drum brake assembly acts as the duo-servo brake.

Figure 12:
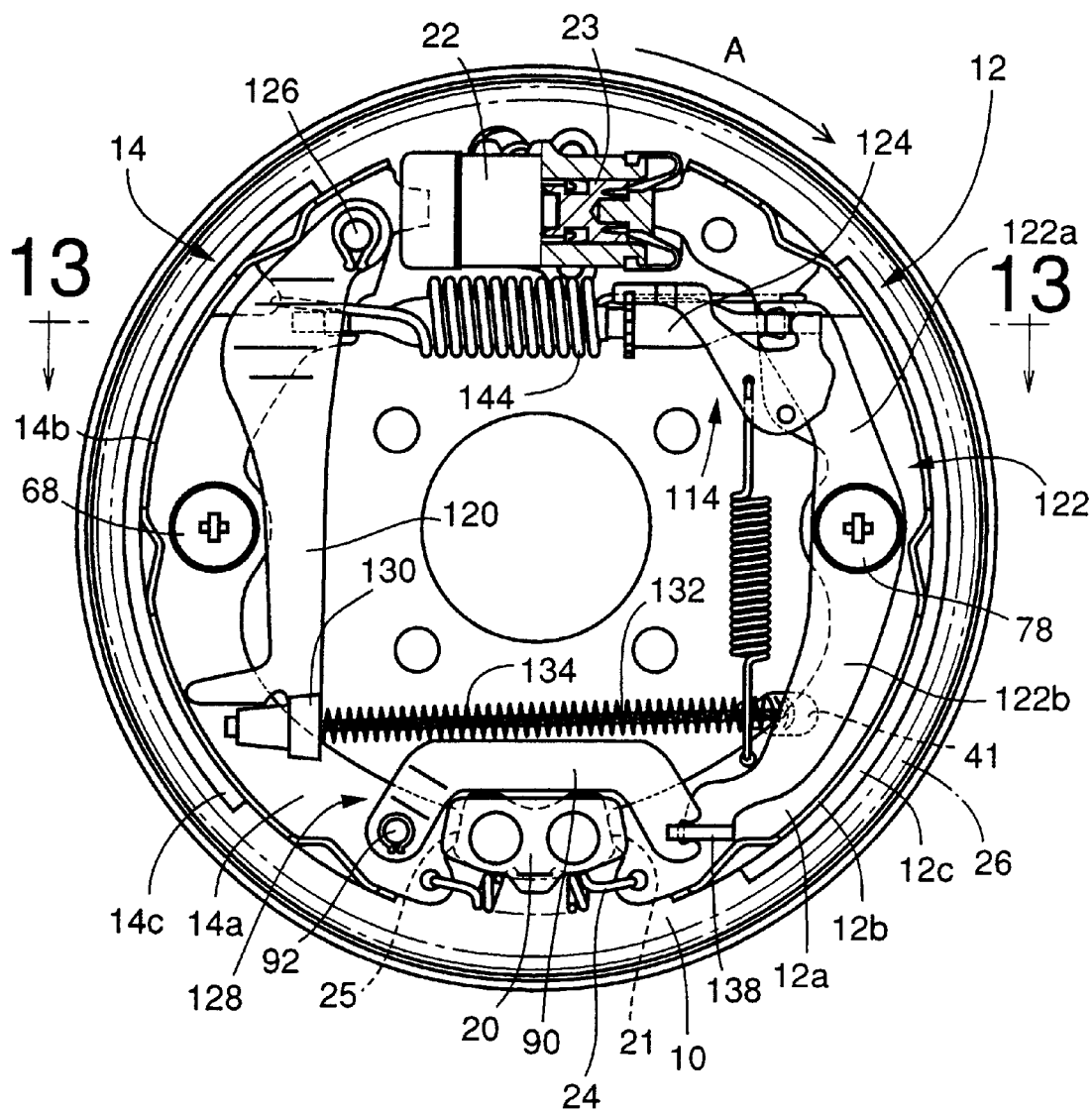
FIG. 12 is a partially cut-away front elevational view partly in cross section showing a dual-mode drum brake assembly according to a further preferred mode of this invention.

In the drum brake assemblies according to the first and second modes of this invention, the strut 28, 110 is operatively associated with the brake shoes 12, 14, so that the torque transmitted from the rotating brake drum 26 to one of the brake shoes 12, 14 is transmitted through the strut 28, 110 to the other brake shoe 12, 14 when the drum brake assembly acts as the duo-servo system upon operation of the parking brake operating member. However, the torque may be transmitted through the intermediate lever as well as the strut. For instance, the torque may be transmitted through a strut 124 interposed between the brake shoe 14 and an intermediate lever 122, as in a dual-mode drum brake assembly shown in FIG. 12. In this mode of the invention, the first strut 124, the second strut 90 and intermediate lever 122 cooperate to constitute a link mechanism 128. The brake shoe 12 to which the intermediate lever 122 is operatively connected is referred to as the first brake shoe while the brake shoe 14 is referred to as the second brake shoe. In FIG. 12, the same reference numerals as used in FIGS. 8–11 are used to identify the elements having substantially the same function as in FIGS. 8–11, and redundant description of these elements will not be provided.

In the drum brake assembly of FIG. 12, the upper end portion of the web 14a of the second brake shoe 14 on the side of the wheel cylinder 22 is pivotally connected to the upper end portion of the parking lever 120. That is, the web 14a has a connecting member in the form of a connecting pin 126 formed at its upper end portion such that the connecting pin 126 extends in the direction perpendicular to the backing plate 10. The parking lever 120 has a hole engaging the end portion of the connecting pin 126 such that the parking lever 120 is pivotable relative to the web 14a about the centerline of the pin 126.

The parking lever 120 extends along the web 14a from the connecting pin 126, and the lower end portion of the parking lever 120 is located near the anchor 20. The parking lever 120 has a cable fixing portion 130 at the lower end portion, and a cable 132 is fixed at one end thereof to the cable fixing portion 130. In FIG. 12, reference numeral 134 denotes a return spring functioning as biasing means in the form of an elastic member. The return spring 134 returns the parking lever 120 to its original or non-operated position of FIG. 12 when the parking brake operating member is returned from the operating position to the non-operated position.

Like the intermediate lever 62, the intermediate lever 122 has an intermediate portion pivotally engaging the collar 78b of the hold-down device 78, and is operatively connected to an intermediate portion of the web 12a of the first brake shoe 12 such that the intermediate lever 122 is pivotable relative to the web 12a about a pivot axis perpendicular to the backing plate 10, that is, about the centerline of the collar 78b. The intermediate lever 122 includes a first arm 122a extending from the intermediate portion toward the wheel cylinder 22, and a second arm 122b extending from the intermediate portion toward the anchor 20. Like the second arm 62b of the intermediate lever 62, the second arm 122b has an engaging portion 138 at its lower end. The engaging portion 138 engages the second strut 90.

Figure 13:
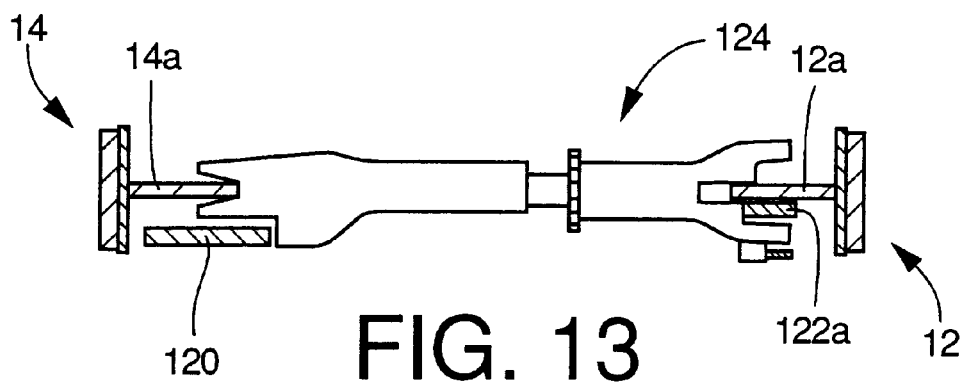
FIG. 13 is a cross sectional view taken along line 13—13 of FIG. 12.

The first strut 124 indicated above is operatively associated at its opposite ends with the first arm 122a of the intermediate lever 122 and a portion of the parking lever 120 between the connecting pin 126 and the free end. The first strut 124 is axially extendible by a screw mechanism. As shown in FIG. 13, the left end portion of the first strut 124 engages the web 14a of the second brake shoe 14 is opposed to the parking lever 120, while the right end portion of the first strut 124 engages the first arm 122a of the intermediate lever 122 and the web 12a of the first brake shoe 12. The opposite end portions of the first strut 124, the web 14a and the first arm 122a have notches or cutouts for preventing removal of the first strut 124 from the associated components and displacement of the first strut 124 in the vertical direction (as seen in FIG. 12) and in the axial direction perpendicular to the backing plate 10.

An elastic member in the form of a return spring 144 (first spring member) is disposed around the first strut 124, and is connected at its opposite ends to the two brake shoes 12, 14. When the drum brake assembly is not in operation, the web 14a and the first arm 122a of the intermediate lever 122 are held in solid engagement with the opposite end portions of the first strut 124 under the biasing force of the return spring 124, whereby the brake shoes 12, 14 are placed in the non-operated position. The non-operated position of the brake shoe 12 is determined by the solid engagement of the intermediate lever 122 with the first strut 124, as indicated in FIG. 13. When the parking brake is not applied, there exist small clearances between the parking lever 120 and the first strut 124 and between the web 12a and the first strut 124, in the longitudinal direction of the first strut 124, as also indicated in FIG. 13.

In the present drum brake assembly constructed according to the third mode of this invention, an operation of the service brake operating member will activate the wheel cylinder 22 to move the brake shoes 12, 14 outward in the directions away from each other such that the brake shoes 12, 14 are pivoted about the points of abutting contact with the anchor 20, whereby the linings 12c, 14c are forced against the inner circumferential surface of the brake drum 26, to produce a braking force acting on the brake drum 26. Thus, the drum brake assembly acts as the leading/trailing brake.

When the parking brake operating member is operated with the service brake remaining applied, a force transmitted to the parking lever 120 through the cable 74 is transferred as explained below by reference to the schematic view of FIG. 14.

Figure 14:
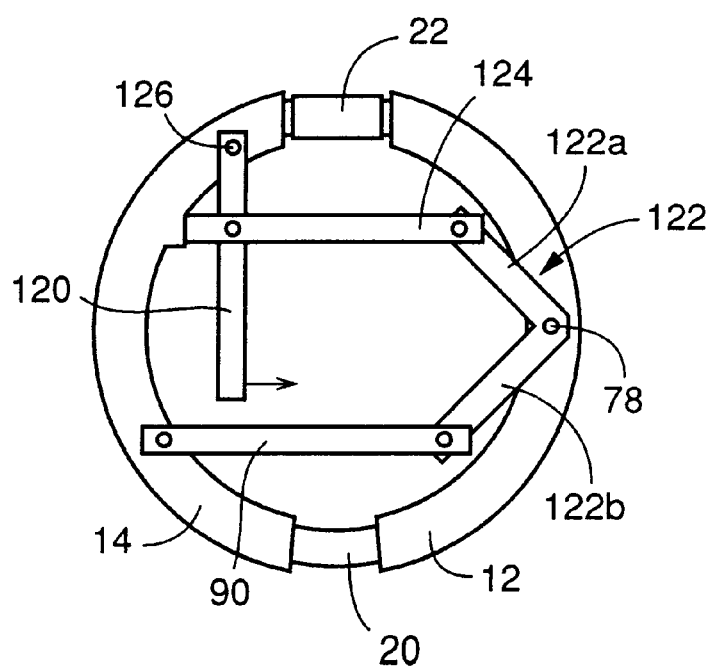
FIG. 14 is a schematic view for explaining an operation of the drum brake assembly of FIG. 12 upon parking brake application to the vehicle.

Initially, the force transmitted to the parking lever 120 causes the parking lever 120 to be pivoted, forcing the intermediate lever 122 through the first strut 124, so that the intermediate lever 122 is pivoted in the clockwise direction as seen in FIG. 14, whereby the first arm 122a is forced outward. A reaction force acts on the connecting pin 126 of the parking lever 120, causing a torque to act on the second brake shoe 14 so as to pivot it in the counterclockwise direction, whereby the upper end portion of the brake shoe 14 near the wheel cylinder 22 is forced outward. Further, a force is transmitted from the intermediate lever 122 to the brake shoe 14 through the second strut 90, so as to force the brake shoe 14 outward, while a reaction force acts on the intermediate lever 122. With this reaction force and the force received from the first strut 124, the entirety of the intermediate lever 122 is forced outward, forcing the first brake shoe 12 outward through the collar 78b of the hold-down device 78. The lower end portions of the brake shoes 12, 14 remain in abutting contact with the anchor 20.

In this case where the parking brake operating member is operated while the service brake remains applied, the brake shoes 12, 14 are forced against the brake drum 26 by the pistons 23 of the wheel cylinder 22 while the lower end portions of the brake shoes 12, 14 are held in abutting contact with the anchor 20. Even if a drive torque acts on the vehicle wheel after the service brake operating member is returned to its non-operated position, the brake shoes 12, 14 are held forced against the brake drum 26 with the lower end portions thereof held in abutting contact with the anchor 20, unless the drive torque is larger than the braking torque acting on the vehicle brake drum 26 when the drum brake assembly is acting as the leading/trailing brake. If the drive torque exceeds the braking torque, the brake drum 26 is rotated, causing the drum brake assembly to act as the duo-servo brake.

If a large torque acts on the brake drum 26 in the forward direction indicated at A in FIG. 12, the brake shoes 12, 14 tend to be dragged along with the brake drum 26 rotating in the forward direction, the brake shoe 14 is rotated with the brake drum 26 and moved away from the anchor 20. The torque acting on the first brake shoe 14 is transmitted to the brake shoe 12 through the first strut 124, intermediate lever 122, etc. The second brake shoe 12 is held in abutting contact with the anchor 20, and the torques acting on the brake shoes 12, 14 due to the dragging tendency are received by the anchor 20, whereby the drum brake assembly acts as the duo-servo brake.

As in the preceding modes of the invention, the lever ratios of the parking lever 120 and the intermediate lever 122 and the dimensions of the associated components are determined so as to substantially prevent a movement of the cable fixing portion 72 of the parking lever 120 upon transition of the drum brake assembly from the leading/trailing brake system to the duo-servo brake system.

When the parking brake operating member is operated without the service brake application, the brake shoes 12, 14 are forced against the brake drum 26. If large torques act on the brake shoes 12, 14 due to the dragging tendency upon rotation of the brake drum 26 in the forward or reverse direction, the brake shoe 12 or 14 is brought into abutting contact with the anchor 20, whereby the drum brake assembly acts as the duo-servo brake.

The present drum brake assembly is arranged such that the comparatively large torque acting on the second brake shoe 14 due to the dragging tendency is transmitted to the first brake shoe 12 through the first strut 124, intermediate lever 122, etc., as described above. Accordingly, the intermediate lever 122, second strut 90, etc. are required to have sufficiently high strength or rigidity. In the drum brake assembly of FIGS. 8–11, however, the torque is transmitted from the second brake shoe 14 to the first brake shoe 12 through the third strut 110, and the intermediate lever 122 and the second strut 90 are not required to have high strength or rigidity.

Figure 15:
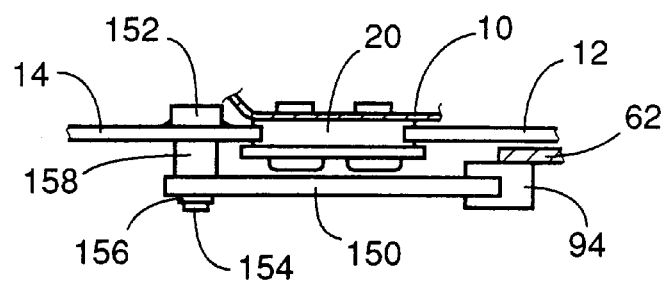
FIG. 15 is a plan view showing a second strut together with an anchor in a dual-mode drum brake assembly according to a still further preferred mode of the invention.
Figure 16:
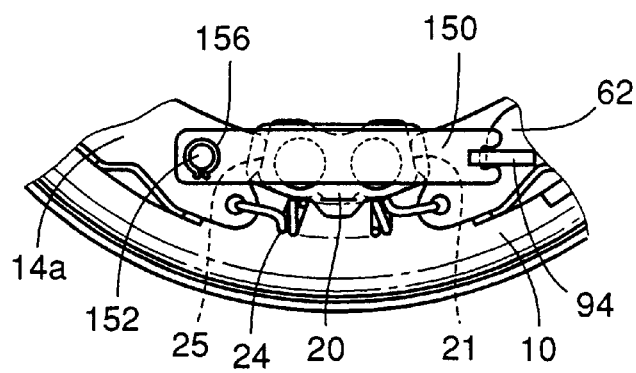
FIG. 16 is a plan view showing the second strut and anchor of the drum brake assembly of FIG. 15.

In the drum brake assembly of FIGS. 8–11 and the drum brake assembly of FIGS. 12–14, the second strut 90 is operatively connected to the second brake shoe 14 and the intermediate lever 62, 122, at the positions lying on a plane which includes the points of abutting contact of the brake shoes 12, 14 with the anchor 20 and which is parallel to the axis of the drum brake assembly. Further, the second strut 90 has the intermediate straight portion which is located inwardly of the anchor 20 and between the curved portions adjacent to the opposite end portions. However, the second strut 90 need not be curved to by-pass the anchor 20. For example, the second strut 90 may be replaced by a second strut 150 which is disposed on one side of the anchor 20 remote from the backing plate 10 and extends linearly in spaced-apart relationship with the anchor 20, as shown in FIGS. 15 and 16. In this fourth mode of the invention, the web 14a of the second brake shoe 14 has a connecting member in the form of a connecting pin 152 fixed thereto so as to extend in the direction perpendicular to the plane of the backing plate 10. The connecting pin 152 is a stepped shaft having a small-diameter portion 154 and a large-diameter portion 158. The second strut 150 has one end portion pivotally engaging the small-diameter portion 154, and a retainer ring 156 is fixed to the small-diameter portion 154 to prevent removal of the second strut 150 from the connecting pin 152. The length of the large-diameter portion 158 is determined to provide a spacing between the web 14a and the second strut 150, which spacing is sufficient to avoid an interference of the second strut 150 with the anchor 20. The other end portion of the second strut 150 engages the engaging portion 94 of the intermediate lever 62, as in the second mode of the invention of FIGS. 8–11. The dimension of the engaging portion 94 in the direction perpendicular to the backing plate 10 is determined to be large enough to engage the second strut 150.

Figure 17:
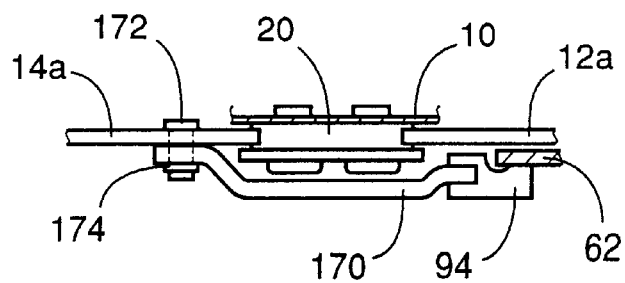
FIG. 17 is a plan view showing a second strut together with an anchor in a dual-mode drum brake assembly according to a yet further preferred mode of this invention.

Referring next to FIG. 17, there is shown a second strut 170 provided in a fifth preferred mode of this invention. The second strut 170 is disposed on one side of the anchor 20 remote from the backing plate 10, and extends so as to avoid an interference with the anchor 20. The second strut 170 is bent at its opposite end portions. Described in detail, the brake shoe 14 has a connecting member in the form of a connecting pin 172 fixed to the web 14a, and one of the opposite bent end portions of the second strut 170 engages the portion of the connecting pin 172 which extends from the web 14a. A retainer ring 174 is fixed to the pin 172 to prevent the removal of the second strut 170 from the pin 172. No clearance is left between the web 14a and the end portion of the second strut 170 fixed to the pin 172, in the direction perpendicular to the backing plate 10. The other bent end portion of the second strut 170 engages the engaging portion 94 of the intermediate lever 62. Owing to the bending of the second strut 170 at this other end portion, its distance to the intermediate lever 62 in the direction perpendicular to the backing plate 10 is reduced.

In the second through fifth modes of the invention of FIGS. 8–17, the parking lever and the intermediate lever are disposed on the left and right sides of the drum brake assembly as viewed in FIGS. 8 and 12. This arrangement of the parking and intermediate levers is advantageous over the arrangement in the first mode of FIGS. 1–7 wherein the two levers are both located on the left side. Namely, the former arrangement assures substantially even weight distribution of the drum brake assembly, and substantially symmetrical spatial arrangement with respect to the vertical line passing the axis of the drum brake assembly. Accordingly, the drum brake assembly of FIGS. 8–17 assures higher operating stability under vibrating conditions of the automotive vehicle, and permits easier assembling, than the drum brake assembly of FIGS. 1–7.

While the presently preferred modes of the present invention have been described above in detail by reference to the accompanying drawings, it is to be understood that the invention may be otherwise embodied.

Although the hold-down device 18, 78 is utilized to connect the intermediate lever 34, 62, 122 to the brake shoe 14, 12, suitable means such as a connecting pin other than the hold-down device 18, 78 may be provided to connect the intermediate lever to the brake shoe.

The second strut 44 provided in the first mode of the invention of FIGS. 1–7 may be replaced by a second strut which by-passes the anchor 20 and which is operatively associated with the intermediate lever 34 and the brake shoe 12, at positions lying on a plane which includes the two points of abutting contact of the brake shoes 12, 14 with the anchor 20 and which is parallel to the axis of the drum brake assembly.

It is to be understood that the present invention may be embodied with various other changes, modifications and improvements, which may occur to those skilled in the art, without departing from the scope of the invention defined in the following claims:

What is claimed is:

1. A dual-mode drum brake assembly for a vehicle wheel, comprising:

a stationary backing plate in the form of a generally circular disc opposed to an opening of a brake drum rotated with the vehicle wheel;

a wheel cylinder which is open at opposite ends thereof and which is disposed on a radially outer portion of said backing plate such that an axial direction of said wheel cylinder is tangential to a circumference of said backing plate, said wheel cylinder having a pair of pistons which are extendible outwardly from said opposite ends;

an anchor fixed to a circumferential portion of said backing plate which is diametrically opposite to said radially outer portion;

two brake shoes which are supported by said backing plate movably in a plane parallel to a plane of said backing plate, said two brake shoes having a first pair of adjacent ends opposed to said opposite ends of said wheel cylinder, and a second pair of adjacent ends opposite to said first pair and opposed to respective opposite ends of said anchor;

a parking lever disposed substantially along one of said two brake shoes, and having a pivot axis at a portion thereof closer to said wheel cylinder than to said anchor, and a cable fixing portion at a free end portion thereof closer to said anchor than to said wheel cylinder, said pivot axis being perpendicular to the plane of said backing plate; and a link mechanism disposed between said parking lever and said two brake shoes, and operating to move said adjacent ends of said second pair of said two brake shoes away from each other, with a pivotal movement of said parking lever about said pivot axis, at least when a torque acts on said brake drum, and said link mechanism enabling the dual-mode brake assembly to act as a duo-servo brake at least when said torque acts on said brake drum, and wherein said one and the other of said two brake shoes consist of a first brake shoe and a second brake shoe, respectively, and said link mechanism includes:

an intermediate lever having an intermediate portion connected to an intermediate portion of said first brake shoe such that said intermediate lever is pivotable about a pivot axis perpendicular to the plane of said backing plate, said intermediate lever including a first arm extending from said intermediate portion in a direction toward said wheel cylinder, and a second arm extending from said intermediate portion in a direction toward said anchor, said parking lever being connected to said first arm pivotally about said pivot axis of said parking lever;

a first strut operatively associated at opposite end portions thereof respectively with portions of said first and second brake shoes which are closer to said wheel cylinder than to said anchor, said first strut being engageable with a portion of said parking lever between said pivot axis and said free end portion; and a second strut operatively associated at opposite end portions thereof respectively with said second arm of said intermediate lever and a portion of said second brake shoe which is closer to said anchor than to said wheel cylinder.

2. The dual-mode drum brake assembly according to claim 1, wherein said wheel cylinder and said anchor are fixed to an upper portion and a lower portion of said backing plate, respectively, and said parking lever has said pivot axis at an upper portion thereof and is suspended downwardly from said pivot axis.

3. The dual-mode drum brake assembly according to claim 1, wherein said first strut is provided with a length adjusting mechanism for adjusting a length of said first strut.

4. The dual-mode drum brake assembly according to claim 1, further comprising biasing means for biasing said two brake shoes toward each other.

5. The dual-mode drum brake assembly according to claim 4, wherein said biasing means includes:

a first spring member for biasing portions of said two brake shoes which are closer to said wheel cylinder than to said anchor; and a second spring member for biasing portions of said two brake shoes which are closer to said anchor than to said wheel cylinder.

6. The dual-mode drum brake assembly according to claim 1, wherein said first brake shoe has a web substantially parallel to the plane of said backing plate, and said web 14a, said intermediate lever and said parking lever are superposed on each other such that said web is interposed between said intermediate lever and said parking lever.

7. The dual-mode drum brake assembly according to claim 6, wherein said pivot axis of said parking lever is provided by a connecting pin for pivotal connection between said intermediate lever and said parking lever, and said web of said first brake shoe includes a portion which permits said connecting pin to extend therethrough and to move upon a pivotal movement of said intermediate lever about said pivot axis.

8. The dual-mode drum brake assembly according to claim 1, further comprising a hold-down device for pivotally connecting said first brake shoe to said backing plate, wherein said hold-down device comprises a hold-down pin, and said first brake shoe includes a web substantially parallel to the plane of said backing plate, said web having a pin hole which permits said hold-down pin to extend, said hold-down device further comprising a hollow cylindrical collar fitted in said pin hole, said intermediate lever being pivotally connected to said web through said collar such that said intermediate lever is pivotable relative to said web about an axis of said collar.

9. The dual-mode drum brake assembly according to claim 1, wherein said anchor has two abutting surfaces at said opposite ends for abutting contact with said second pair of adjacent ends of said two brake shoes, at least one of said two abutting surfaces having an angle of not larger than 7° with respect to a plane which passes centers of said wheel cylinder and said anchor and which is perpendicular to the plane of said backing plate.

10. The dual-mode drum brake assembly according to claim 1, wherein said link mechanism includes an intermediate lever having an intermediate portion connected to an intermediate portion of said one of said two brake shoes such that said intermediate lever is pivotable about a pivot axis perpendicular to the plane of said braking plate, said intermediate lever including a first arm extending from said intermediate portion in a direction toward said wheel cylinder, and a second arm extending from said intermediate portion in a direction toward said anchor.

11. The dual-mode drum brake assembly according to claim 1, wherein said link mechanism includes an intermediate lever having an intermediate portion connected to an intermediate portion of the other of said two brake shoes that said intermediate lever is pivotable about a pivot axis perpendicular to the plane of said braking plate, said intermediate lever including a first arm extending from said intermediate portion in a direction toward said wheel cylinder, and second arm extending from said intermediate portion in a direction toward said anchor.

12. A dual-mode drum brake assembly for a vehicle wheel, comprising:

a stationary backing plate in the form of a generally circular disc opposed to an opening of a brake drum rotated with the vehicle wheel;

a wheel cylinder which is open at opposite ends thereof and which is disposed on a radially outer portion of said backing plate such that an axial direction of said wheel cylinder is tangential to a circumference of said backing plate, said wheel cylinder having a pair of pistons which are extendible outwardly from said opposite ends;

an anchor fixed to a circumferential portion of said backing plate which is diametrically opposite to said radially outer portion;

two brake shoes which are supported by said backing plate movably in a plane parallel to a plane of said backing plate, said two brake shoes having a first pair of adjacent ends opposed to said opposite ends of said wheel cylinder, and a second pair of adjacent ends opposite to said first pair and opposed to respective opposite ends of said anchor;

a parking lever disposed substantially along one of said two brake shoes, and having a pivot axis at a portion thereof closer to said wheel cylinder than to said anchor, and a cable fixing portion at a free end portion thereof closer to said anchor than to said wheel cylinder, said pivot axis being perpendicular to the plane of said backing plate; and a link mechanism disposed between said parking lever and said two brake shoes, and operating to move said adjacent ends of said second pair of said two brake shoes away from each other, with a pivotal movement of said parking lever about said pivot axis, at least when a torque acts on said brake drum, said link mechanism enabling the dual-mode drum brake assembly to act as a duo-servo brake at least when said torque acts on said brake drum, and wherein the other of said two brake shoes consist of a first brake shoe while said one of said two brake shoes consists of a second brake shoe, and said link mechanism includes:

an intermediate lever having an intermediate portion connected to an intermediate portion of said first brake shoe such that said intermediate lever is pivotable about a pivot axis perpendicular to the plane of said backing plate, said intermediate lever including a first arm extending from said intermediate portion in a direction toward said wheel cylinder, and a second arm extending from said intermediate portion in a direction toward said anchor;

a first strut operatively associated at opposite end portions thereof respectively with said first arm of said intermediate lever and a portion of said parking lever between said pivot axis and said free end portion;

a second strut operatively associated at opposite end portions thereof respectively with said second arm of said intermediate lever and a portion of said second brake shoe which is closer to said anchor than to said wheel cylinder.

13. The dual-mode drum brake assembly according to claim 12, further comprising a hold-down device for pivotally connecting said first brake shoe to said backing plate, wherein said hold-down device comprises a hold-down pin, and said first brake shoe includes a web substantially parallel to the plane of said backing plate, said web having a pin hole which permits said hold-down pin to extend, said hold-down device further comprising a hollow cylindrical collar fitted in said pin hole, said intermediate lever being pivotally connected to said web through said collar such that said intermediate lever is pivotable relative to said web about an axis of said collar.

14. The dual-mode drum brake assembly according to claim 12, wherein said second strut is operatively associated at the opposite ends thereof with said intermediate lever and said second brake shoe, at respective two positions substantially lying on a plane which includes two points of abutting contacts of said second pair of adjacent ends of said two brake shoes with said opposite ends of said anchor and which is parallel an axial direction of said brake drum, said second strut extending between said two positions while by-passing said anchor.

15. The dual-mode drum brake assembly according to claim 12, further comprising a third strut which extends substantially in parallel with said first strut and which is operatively connected at opposite ends thereof with portions of said first and second brake shoes which are closer to said wheel cylinder than to said anchor.

16. The dual-mode drum brake assembly according to claim 12, wherein said third strut is provided with a length adjusting mechanism for adjusting a length of said third strut.

* * * * *

UNITED STATES PATENT AND TRADEMARK OFFICE
CERTIFICATE OF CORRECTION

PATENT NO.    : 6,044,938
DATED         : April 4, 2000
INVENTOR(S)   : Yabusaki et al.

It is certified that error appears in the above-identified patent and that said Letters Patent is hereby corrected as shown below:

Column 8,
Line 44, after "intermediate" insert -- lever --.
Line 52, change "applicatnion" to -- application --.
Line 55, change "actiong" to -- acting --.

Column 11,
Line 26, change "(13" to -- (13) --.
Line 46, delete "angle".

Column 12,
Line 26, change "2-30°" to -- 2-3° --.

Column 14,
Line 41, change "24" to -- 25 --.

Column 15,
Line 53, change "12cThat" to --12c. That --.

Column 16,
Line 62, delete "to".

Column 20,
Line 19, change "refereed" to -- referred --.

UNITED STATES PATENT AND TRADEMARK OFFICE
CERTIFICATE OF CORRECTION

PATENT NO.   : 6,044,938
DATED        : April 4, 2000
INVENTOR(S)  : Yabusaki et al.

It is certified that error appears in the above-identified patent and that said Letters Patent is hereby corrected as shown below:

Column 22,
Line 5, delete "braking".

Column 25,
Line 5, after "14" insert -- and --.

Column 30,
Line 57, delete "other of".
Line 58, delete "while said one of two brake shoes"; after "shoe" insert -- and --.
Line 59, delete "consists of"; delete "and".

Signed and Sealed this

Fifth Day of February, 2002

Attest:

JAMES E. ROGAN
*Attesting Officer*       *Director of the United States Patent and Trademark Office*